United States Patent
Kindt et al.

(10) Patent No.: US 7,038,820 B1
(45) Date of Patent: May 2, 2006

(54) AUTOMATIC EXPOSURE CONTROL FOR AN IMAGE SENSOR

(75) Inventors: Willem Johannes Kindt, Sunnyvale, CA (US); Bumha Lee, Mountain View, CA (US)

(73) Assignee: Eastman Kodak Company, Rochester, NY (US)

( * ) Notice: Subject to any disclaimer, the term of this patent is extended or adjusted under 35 U.S.C. 154(b) by 925 days.

(21) Appl. No.: 10/115,650

(22) Filed: Apr. 3, 2002

(51) Int. Cl.
*H04N 1/04* (2006.01)

(52) U.S. Cl. ............... 358/474; 358/509; 358/475; 348/297; 348/310

(58) Field of Classification Search ............... 358/474, 358/1.2, 1.9, 3.22, 509, 513, 475, 482; 348/296, 348/297, 308, 310
See application file for complete search history.

(56) References Cited

U.S. PATENT DOCUMENTS

| | | | | |
|---|---|---|---|---|
| 5,541,645 A | * | 7/1996 | Davis | 348/96 |
| 5,781,233 A | * | 7/1998 | Liang et al. | 348/302 |
| 6,784,939 B1 | * | 8/2004 | Lee et al. | 348/364 |
| 6,859,230 B1 | * | 2/2005 | Luo et al. | 348/297 |
| 2001/0028392 A1 | * | 10/2001 | Yamamoto et al. | 348/207 |

* cited by examiner

*Primary Examiner*—Kimberly Williams
*Assistant Examiner*—Negussie Worku
(74) *Attorney, Agent, or Firm*—Peyton C. Watkins

(57) ABSTRACT

An automatic exposure system is arranged to dynamically adjust the exposure time of a pixel array in an imaging system. A selected group of pixels from the pixel array are evaluated using a non-destructive readout procedure to determine the proper exposure time for the pixel array, while the pixel array is exposed to light that is reflected from a scene. Threshold detectors are employed to compare the signals from the selected group of pixels to a peak level that corresponds to a threshold limit for the pixels. The exposure of the pixel array is terminated when at least one pixel from the selected group of pixels exceeds the threshold limit. The threshold limit may be set to a level that is below total saturation for the pixels such that an overexposure margin is provided. Enhanced image contrast is achieved using automatic exposure time adjustment.

42 Claims, 15 Drawing Sheets

AUTOMATIC EXPOSURE CONTROL FOR AN IMAGE SENSOR

FIELD OF THE INVENTION

The present invention relates to image sensing pixel cells. More particularly, the present invention is related to automatically adjusting the exposure time of an image on an image sensing pixel array. The present invention is arranged for use with an active or passive (ambient) light source. Also, the present invention may be arranged for use with a mechanical or an electronic based shutter control.

BACKGROUND OF THE INVENTION

A typical film-type camera includes a mechanical shutter. Light is reflected off of a scene from either artificial or natural light conditions. The camera receives the reflected light when the mechanical shutter is opened. While the shutter is opened, the reflected light is focused on a film that contains light sensitive components. The light sensitive components of the film create a chemical recording of the received light. The image, or scene, that is recorded on the film corresponds to the total amount of light that directed onto the film during exposure to the reflected light. The total amount of light directed onto the film is related to the aperture of the shutter, and the exposure time. The exposure time of the film corresponds to the length of time that the mechanical shutter is open. The exposure time is a fixed time interval that is manually adjusted by an operator.

Digital cameras are similar to film-type cameras in that light is reflected off of the scene and received by a light sensitive component when the shutter is open. The light sensitive component may be a charge coupled device (CCD), or a complementary metal oxide semiconductor (CMOS) device. The image sensors convert light into electronic signals when exposed. The signals are provided to an image processor to store the image of the recorded scene. In digital cameras, the shutter may be a mechanical shutter that is similar to that found in the film-type camera, or an electronic shutter mechanism.

A typical image sensor includes an array of image capturing points, or pixels. Each pixel is arranged to provide a signal that is responsive to light. The signal level that is provided by each pixel is related to the intensity of the light that is received, and the length of time that the pixel is exposed. A CMOS array is arranged in rows and columns that may be read individually, while a CCD array typically provides a serial read out of the electronic signals. The electronic signals are typically converted into digital signals that are stored in a memory circuit, such that the digitized image is captured.

SUMMARY OF THE INVENTION

The present invention is related to an automatic exposure system and method. The automatic exposure system is arranged to dynamically adjust the exposure time of a pixel array in an imaging system. A selected group of pixels from the pixel array are evaluated using a non-destructive readout procedure to determine the proper exposure time for the pixel array, while the pixel array is exposed to light that is reflected from a scene. Threshold detectors are employed to compare the signals from the selected group of pixels to a threshold level that corresponds to a threshold limit for the pixels. The exposure of the pixel array is terminated when at least one pixel from the selected group of pixels exceeds the threshold limit. The threshold limit may be set to a level that is below total saturation for the pixels such that an overexposure margin is provided. Enhanced image contrast is achieved using automatic exposure time adjustment.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on".

The present invention is related to imaging systems that employ pixel arrays that require automatic adjustment of the exposure time of the pixel array. A subset of the pixels in the pixel array is repeatedly read to perform a sparse non-destructive readout of the pixel array to determine the preferred exposure time. The readout is said to be non-destructive since the signals in the pixel remain intact after the readout of the pixel signal is completed. Assuming a constant scene and a constant illumination, the signals inside the pixels will grow linearly with time. The pixels that receive little or no reflected light correspond to dark objects in the scene, while the pixels that receive greater reflected light correspond to bright objects in the scene. The pixels that receive reflected light from bright objects have corresponding signals that increase faster than the signals associated with a less bright reflection. At the end of the exposure cycle (or the integration time of the pixels), large output signals result from pixels exposed to bright areas and low output signals result from pixels that are exposed to dark areas.

The exposure of a pixel corresponds to the product of the integration time and the illumination level. The pixels in a bright scene will be overexposed when the exposure is too high such that the image details are lost in the bright areas. The pixels will be excessively dark when the exposure is too low such that the image details are lost in the dark regions of the image. The automatic exposure control means (or mechanism) in the present invention is arranged to ensure that the output signals of the pixels exposed to bright areas approach (or just reach) the maximum output signal level (or saturation level) at the end of the integration time. The exposure is interrupted when the largest output signal has reached the saturation level such that contrast in the image is improved. The exposure may be interrupted by any appropriate means, including but not limited to deactivating the light source, closing a mechanical shutter, and closing an electronic shutter.

First Exemplary Imaging System

Figure 1:
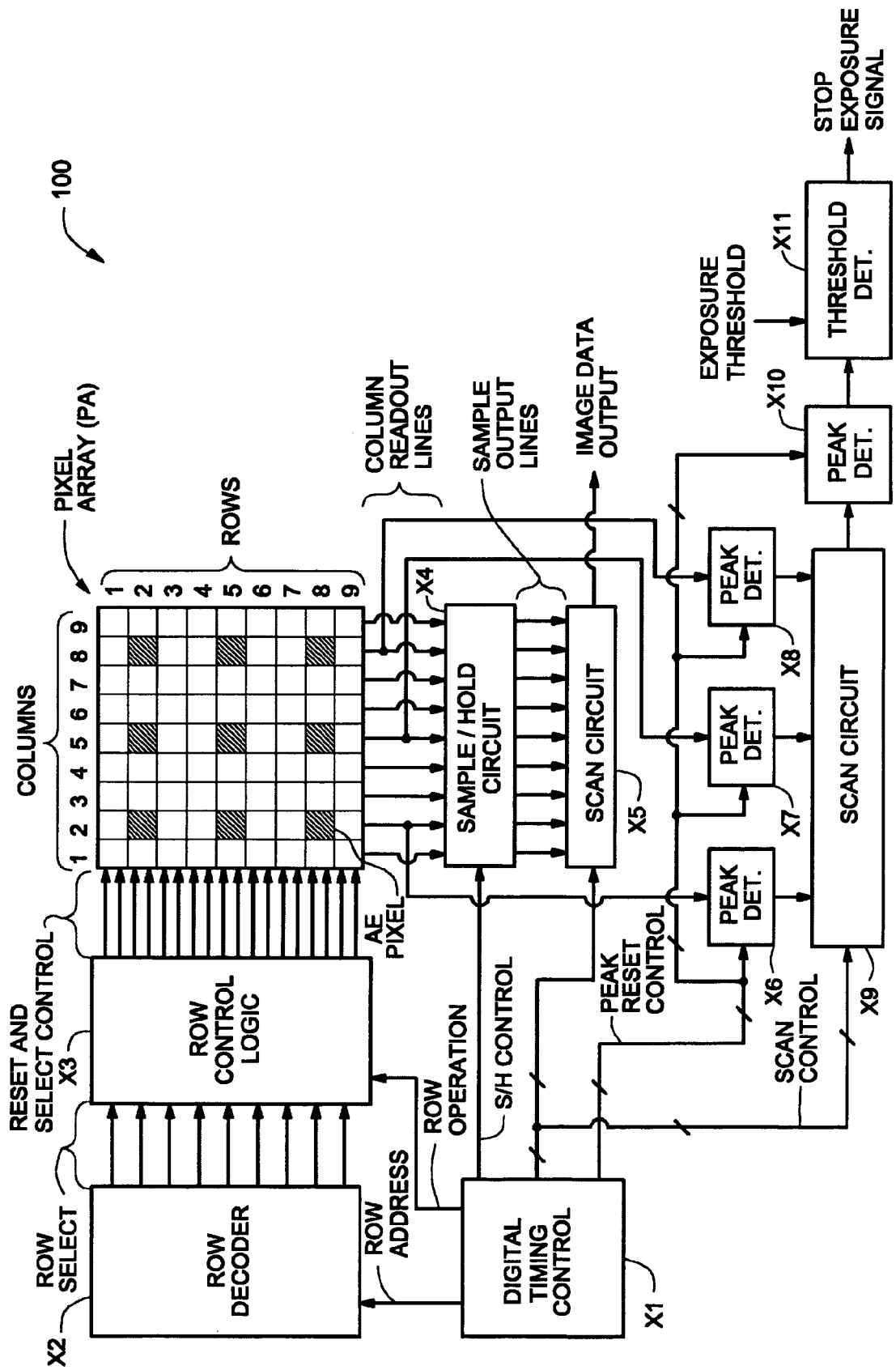
FIG. 1 is a schematic diagram of a first exemplary imaging system.

FIG. 1 shows an exemplary imaging system (100) that includes automatic exposure control that is arranged in accordance with the present invention. Imaging system 100 includes a pixel array (PA) that is configured as a nine by nine array of pixels that are arranged in columns and rows. The pixel array (PA) includes a selected group of pixels (AE pixels) that are used for automatic exposure control. As illustrated in FIG. 1, AE pixels are located in columns 2, 5, and 8, at rows 2, 5, and 8, respectively. Row reset lines are configured to reset a respective row in the pixel array. Row select lines are configured to select a respective one of the rows for readout. When a row select line is selected, each pixel in the selected row is coupled to a respective column readout line.

A digital timing control circuit (X1) provides a row address signal to a row decoder circuit (X2). The row decoder circuit (X2) provides row select signals in response to the row address signal. Each row select signal corresponds to one of the rows in the pixel array (PA). For example, a pixel array that has 128 rows will have 128 addressable rows, with 128 corresponding row select signals.

The digital timing control circuit (X1) provides a row operation control signal to a row control logic circuit (X3). The row control logic circuit (X3) provides the necessary control signals for the pixel array (PA) in response to the row select signals and the row operation control signal. In one example, the row operation signal cooperates with the row control logic circuit (X3) to select between resetting (or initializing) a row and selecting a row for output. For this example, each row of the pixel array (PA) is coupled to a row reset line and a row select line.

A sample/hold circuit (X4) is arranged to receive column outputs from the column readout lines of the pixel array (PA). The sample/hold circuit (X4) is arranged to provide one or more sample output lines, corresponding to the output (or outputs) of the sample/hold circuit (X4). The sample/hold circuit (X4) depicted in FIG. 1 includes separate sample and hold circuits (or means for sampling and holding) for each column readout line. A scan circuit (X5) is arranged to receive signals from the sample output lines, and provide an image data output signal. The image data output signal may be further processed for use in an analog-to-digital converter (ADC).

In one example, the sample/hold circuit (X4) includes a separate sample and hold means for each column. In another example, a single sample and hold means is selectively coupled to each of the columns, and the sample and hold means provides a serial output. Each sample and hold circuit may require one or more control lines such as reset, clocking lines, and the like. The digital timing control circuit (X1) is arranged to provide a S/H control signal to the sample/hold circuit (X4), which may include multiple control signals as may be necessary for a particular sample and hold circuit topology.

The scan circuit (X5) receives a scan control signal from the digital timing control circuit (X1), such that each sample output line is selectively provided to the image data output. The scan circuit (X5) may be implemented as a series of switches, with each sample output line having a corresponding scan switch, where the switches selectively couple the sample output lines to the image data output. The scan control signal may include multiple control signals as required by the implementation of the scan circuit (X5). For example, scan circuit (X5) and scan circuit (X9, see discussion below) may have separate scan control lines.

A group of peak signal detector circuits (X6–X8) are coupled to a selected group of column readout lines. The selected group of column readout lines corresponds to the selected group of pixels (AE pixels), as previously described above. For example, as illustrated in FIG. 1, peak signal detector circuits X6, X7, and X9 are coupled to the column readout lines for columns 2, 5, and 8, respectively. The peak signal detector circuits (X6–X8) are reset by a peak reset control signal that is provided by the digital timing control circuit. The peak signal detector circuits (X6–X8) store a value that corresponds to the peak signal level of the corresponding column readout line. Each time a selected column readout line changes, the corresponding peak signal detector circuit evaluates the signal. When the new column readout signal is greater than the currently stored value in the peak signal detector, the peak signal detector stores the new column readout. The peak signal levels of the pixel array are referenced with respect to the high power supply (VDD), such that the peak signal detector circuits store peak signal levels of the pixels. The pixel signal levels increase as they are exposed such that the difference between the high power supply (VDD) and the voltage associated with the pixel increases. Thus, as the exposure of the pixels increases, the absolute value of the column readout line voltage decreases, and the peak signal detectors detect the lowest voltage on the column readout line.

Another scan circuit (X9) is arranged to selectively couple each output from the group of peak signal detector circuits (X6–X8) to another peak signal detector circuit (X10) in response to a scan control signal. The scan circuit cooperates with the scan control signal such that only one of the peak signal detector outputs is coupled to the input of the other peak signal detector (X10). The other peak signal detector circuit (X10) is arranged to store the highest peak signal level of all of the peak signal detectors from the group of peak signal detector circuits, and is reset in response to the peak reset control signal. The peak reset control signal may include multiple peak reset control signals as required by the implementation of the peak signal detector circuits (X6–X8, X10). For example, each peak signal detector circuit may have a separate peak reset control signal, or peak signal detector circuits X6–X8 may have one peak reset control signal, while peak signal detector circuit X10 has another peak reset control signal.

A threshold detector circuit (X11) is arranged to receive the output from the other peak signal detector circuit (X10) and compare the peak signal level to an exposure threshold. The threshold detector circuit includes an output that is arranged to provide a stop exposure signal that indicates when the exposure threshold has been reached. The stop exposure signal is asserted when the output of any one of the scanned peak signal detector circuits (X6–X8), which are provided to the other peak signal detector circuit (X10), exceeds the exposure threshold.

Each pixel in the pixel array has a maximum and minimum signal level that corresponds to the total exposure of the pixel to light. In one example, a column readout line from the pixel array corresponds to a maximum voltage (e.g., VDD) when the pixel corresponds to a black level, and the pixel array corresponds to a minimum voltage (e.g., ground) when the pixel corresponds to a white level. The exposure time of the pixels in the pixel array should be adjusted such that none of the pixels exceed their saturation limit. The saturation limit for a given pixel in a pixel array corresponds to a condition where further exposure to light yields no change in signal provided by the pixel. For example, the voltage associated with one pixel in the array decreases when it is exposed by a bright light. In this example, the voltage cannot decrease below the minimum system voltage (e.g., ground), and further exposure to light will not result in a change in the image with respect to the exposed pixel. However, other pixels in the pixel array will also be exposed such that the total image will have poor contrast.

To improve the contrast in the image, no one pixel in the pixel array should reach total saturation (the point where further exposure results in no change in the image). Ideally, every pixel in the pixel array may be scanned (an entire frame) to determine when any one pixel reaches total saturation. However, scanning every pixel in the array may take a long time such that the first pixel scanned and the last pixel scanned are sufficiently far apart in time to create an overexposure condition in the array. For example, the first pixel scanned may be just below the saturation limit at the beginning of the scan, while at the end of the scan the pixel has already exceeded the saturation limit.

A selection of pixels (AE pixels) from the pixel array is sampled to determine an appropriate exposure time such that overexposure of the pixel array is avoided in real time. By sub-sampling the pixels in the pixel array, and determining when any one of the sub-sampled pixels approaches or reaches saturation, the preferred exposure time can be determined. As shown in FIG. 1, AE pixels are dispersed among the matrix of pixels in the pixel array. The AE pixels correspond to a group of pixels that will be sampled as the frame is processed. The AE pixels are arranged at particular locations in the pixel array such that parallel processing of the peak detection of the pixel array is possible. The exposure of the pixel array is halted when the exposure threshold is reached such that none of the scanned AE pixels in the pixel array exceed their saturation limit.

Each AE pixel is periodically evaluated by monitoring the signal readout corresponding to the particular pixel. The number of AE pixels that are evaluated in each frame determines the total processing time that is required to handle the frame. When evaluated individually, the processing time to evaluate the exposure of each AE pixel is determined by the access time to read each pixel individually. However, a particular AE pixel may become overexposed between adjacent time periods, resulting in loss of contrast and poor image quality. Parallel processing may be employed to reduce the overall latency in observing the AE pixels. Instead of individually evaluating each AE pixel by its corresponding row and column, an entire row of AE pixels are evaluated within the same row processing time interval. With parallel processing, the number of rows processed and the row processing time interval determines the total latency between observations for each AE pixel. Parallel processing reduces the possibility of overexposing an AE pixel between successive observations.

Exemplary 3-T Pixel Cell

Figure 2:
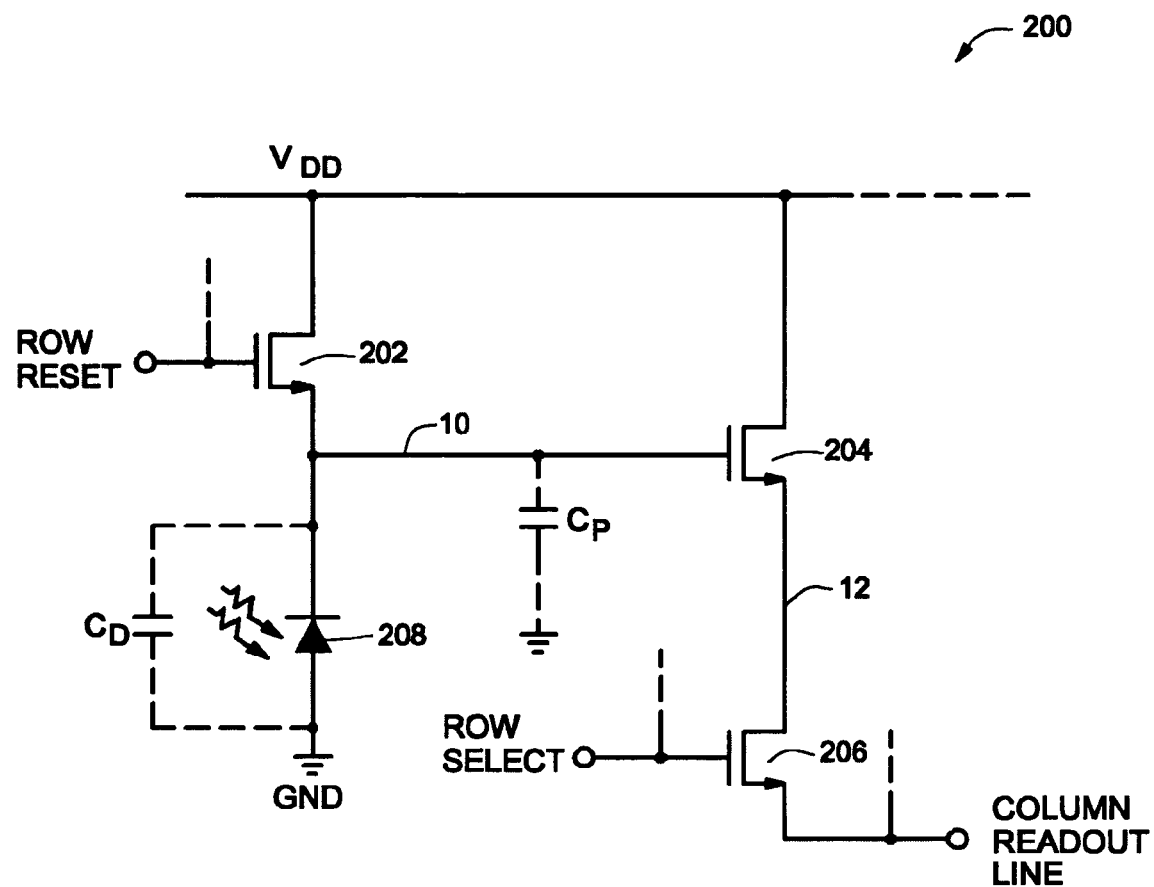
FIG. 2 is a schematic diagram of an exemplary pixel cell.

FIG. 2 is a schematic diagram of an exemplary pixel cell (200) from a pixel array that is arranged in accordance with the present invention. The pixel cell includes three transistors and will be hereinafter referred to as a 3-T pixel cell. The 3-T pixel cell includes a photodiode (208), and three NMOS transistors (202, 204, 206).

Transistor 202 has a gate that is coupled to a row reset signal, a drain that is coupled to a high power supply (VDD), and a source that is coupled to the photodiode at node 10. The photodiode has a cathode that is coupled to node 10 and an anode that is coupled to a low power supply (GND). Transistor 204 has a gate that is coupled to node 10, a source that is coupled to node 12, and a drain that is coupled to the high power supply (VDD). Transistor 206 has a gate that is coupled to a row select signal, a source that is coupled to a column readout line, and a drain that is coupled to node 12. Transistor 202 is arranged to reset the pixel cell when activated by the row reset signal. Transistor 204 operates as a source follower voltage that buffers the voltage from node 10. Transistor 206 is arranged to couple the output of the source follower (transistor 204) to the column readout line when activated by the row select signal.

The general operation of the 3-T pixel cell is as follows. A positive pulse is applied to the gate of transistor 202 so that a positive bias voltage is applied at the cathode of photodiode 208. The photodiode has an inherent depletion layer capacitance (Cd) that charges up while power is applied to the photodiode. After transistor 202 turns off, the photodiode 208 remains biased at the positive bias voltage because of the charge that is stored in its depletion layer capacitance (Cd). A photocurrent (Ip) will flow from the cathode to the anode of the photodiode when the photodiode receives photons (light). The photocurrent (Ip) discharges the photodiode's depletion layer capacitance (Cd) and causes the voltage across photodiode 208 to drop.

Stray and parasitic capacitances (Cp) are present on node 10 in pixel cell 200. The stray and parasitic capacitance (Cp) is substantially determined by the parasitic capacitance from the gate of transistor 204 (the source follower) and the parasitic capacitance from the source of transistor 202 (the reset transistor). The bias voltage that is initially applied to the photodiode is stored on the combination of capacitors Cp and Cd.

The photocurrent (Ip) is integrated on the depletion layer capacitance (Cd) along with the parasitic capacitance (Cp) during an integration time (Ti). The total charge that is integrated on the capacitance is determined by Ip*Ti. At the end of the integration interval, the output voltage (Vd) of the photodiode is decreased by an amount (Vs) that is determined by Vs=Ip*Ti/(Cd+Cp). Thus, the output voltage (Vd) of the photodiode is determined by Vd=Vi−Vs, where Vi is the initial voltage that is stored on capacitor Cd prior to applying light to the photodiode. Vs is described as the signal voltage, since it is related to the intensity of received light (Ip) and the length of the exposure time (Ti).

The output voltage (Vd) is applied to the gate of the transistor 204, which operates a source follower, such that the signal at node 12 corresponds to (Vd−Vt), where Vt is the threshold voltage of transistor 204. A positive pulse is applied to the gate of transistor 206 (the row select transistor) via the row select signal such that the readout voltage (Vd−Vt) is coupled to the column readout line at the source of transistor 206. The column readout line receives a readout voltage that is related to the output voltage (Vd) of the photodiode by an offset voltage. The offset voltage corresponds to the threshold voltage (Vt) of transistor 204. The sample/hold circuit from FIG. 1 may be arranged to correct for the offset that is created by the source follower (transistor 204). In one example, the sample/hold circuit may be arranged as a correlated double sampling (CDS) circuit.

A correlated double sampling circuit is used to reduce the fixed pattern noise that would otherwise be introduced by the source follower (transistor 204) inside the pixel cell (200). The voltage on the column readout line is one threshold voltage (Vt) below the voltage on the cathode of the photodiode (208). The source follower in each pixel cell may have a different threshold voltage, due to processing variations, parasitic effects as well as other sources of error. The variations in the threshold voltage (Vt) of the source follower can result in differences in the black levels for each individual pixel cell.

Prior to a first sampling interval, the photodiode (i.e., photodiode 208) in the pixel cell is exposed to light. The readout voltage (Vd−Vt) is sampled as a first sample voltage during the first sampling interval. The first sample voltage is determined by Vi−Vs−Vt, in which Vs is the signal voltage as defined above, Vi is the initialization voltage of the pixel after a reset, and Vt is the threshold voltage of the source follower (i.e., transistor 204). The photodiode (i.e., photodiode 208) is reset to the initialization voltage (Vi) at the conclusion of the first sampling interval. The readout voltage is sampled again as a second sample voltage during a second sampling interval. Since the photodiode has not been exposed to light, the second sample voltage is determined by (Vi−Vt). The signal voltage (Vs) is determined by subtracting the first sample voltage from the second sample voltage.

The maximum possible initialization voltage (or reset voltage) for photodiode 208 corresponds to the potential of the high power supply (VDD). However, the initialization voltage (Vi) is bounded by the threshold voltage (Vt) of transistor 202. In a system where the row reset signal corresponds to the high power supply voltage (VDD), the initialization voltage (Vi) corresponds to the difference between the high power supply voltage and the threshold voltage (VDD−Vt). The minimum detectable readout voltage from the column readout line is bounded by a current source (not shown) that is necessary to bias transistor 204 (the source follower), and the threshold voltage (Vt) of transistor 204. An exemplary current source that may be connected to the column readout line has a saturation voltage corresponding to Vsat. In this example, the minimum detectible signal corresponds to (Vt+Vsat), the maximum detectible signal corresponds to (VDD−Vt), and the maximum signal swing corresponds to the difference (VDD−2*Vt−Vsat).

The photodiode (208) may be reset to the potential of the high power supply (VDD) by using a charge pump circuit (not shown). The charge pump circuit is arranged to bring the voltage on the gate of transistor 202 above the high power supply voltage such that the photodiode (i.e, photodiode 208) is reset to the high power supply voltage (VDD). As described previously, the minimum detectable readout voltage from the column readout line is bounded by a current source (not shown) that is necessary to bias transistor 204 (the source follower), and the threshold voltage (Vt) of transistor 204. However, the maximum signal swing for a charge pump implementation corresponds to (VDD−Vt−Vsat).

Increased signal swing is beneficial in that it improves the dynamic range of the pixel cell. The dynamic range of the pixel cell is defined as the ratio between the maximum detectable signal level and the minimum detectable signal level. The maximum detectable signal level is related to the signal swing. The minimum detectable signal level is determined by the noise level of the pixel, which is usually dominated by kT/C reset noise. The dynamic range is related to the ability of the pixel cell to detect contrast details in both bright and dark regions of the image. For a pixel cell with a relatively low dynamic range, dark regions of the image may be underexposed, while bright regions of the image may be overexposed.

Exemplary 4-T Pixel Cell

Figure 3:
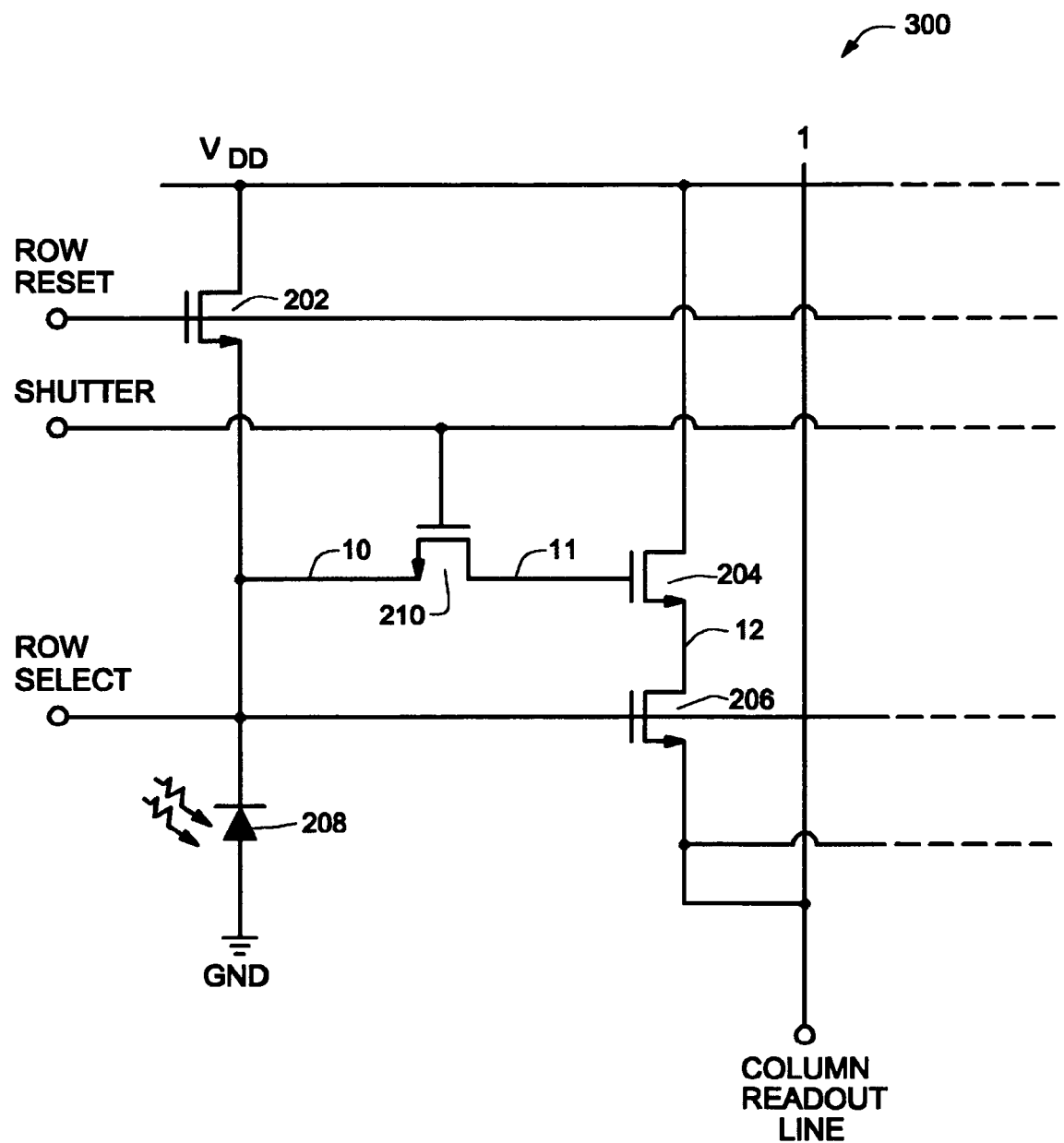
FIG. 3 is a schematic diagram for another exemplary pixel cell.

FIG. 3 is a schematic diagram of another exemplary pixel cell (300) from a pixel array that is arranged in accordance with the present invention. The pixel cell (300), also referred to as a 4-T pixel cell, includes a photodiode (208), and four NMOS transistors (202, 204, 206, 210).

Transistor 202 has a gate that is coupled to a row reset signal, a drain that is coupled to a high power supply (VDD), and a source that is coupled to the photodiode at node 10. The photodiode has a cathode that is coupled to node 10 and an anode that is coupled to a low power supply (GND). Transistor 204 has a gate that is coupled to node 11, a source that is coupled to node 12, and a drain that is coupled to the high power supply (VDD). Transistor 206 has a gate that is coupled to a row select signal, a source that is coupled to a column readout line, and a drain that is coupled to node 12. Transistor 210 has a gate that is coupled to a shutter signal, a drain that is coupled to node 11, and a source that is coupled to node 10.

Pixel cell 300 is arranged in a substantially similar manner to pixel cell 200 described with reference to FIG. 2. Like elements and nodes are labeled identically in FIGS. 2 and 3.

Transistor 204 operates as a source follower voltage that buffers the voltage from node 11. Transistor 206 is arranged to couple the output of the source follower (transistor 204) to the column readout line when activated by the row select signal. Transistor 210 is arranged to operate as an electronic shutter that is actuated in response to the shutter signal.

The electronic shutter operates in an open position when the pixel cell detects received light, and in a closed position when the pixel cell does not detect light. Thus, the electronic shutter is closed when transistor 210 is inactive, and the electronic shutter is open when transistor 210 is active. Parasitic capacitances, such as the capacitance associated with the gate of transistor 204, are arranged to operate as a sampling capacitor for pixel cell 300. Node 11 operates as a storage node of a simple sample and hold circuit that is formed by transistor 210 and the parasitic capacitances at node 11. The photodiode voltage is coupled to the storage node (node 11) when transistor 210 is active. Each source follower (i.e., transistor 204 in FIG. 3) in the pixel array (i.e. pixel array PA in FIG. 1) is arranged to store the signal level of each pixel at the end of the integration time. The column readout lines are later used to read the level of each of the pixels from the respective storage nodes.

Exemplary Threshold Detectors

Figure 4:
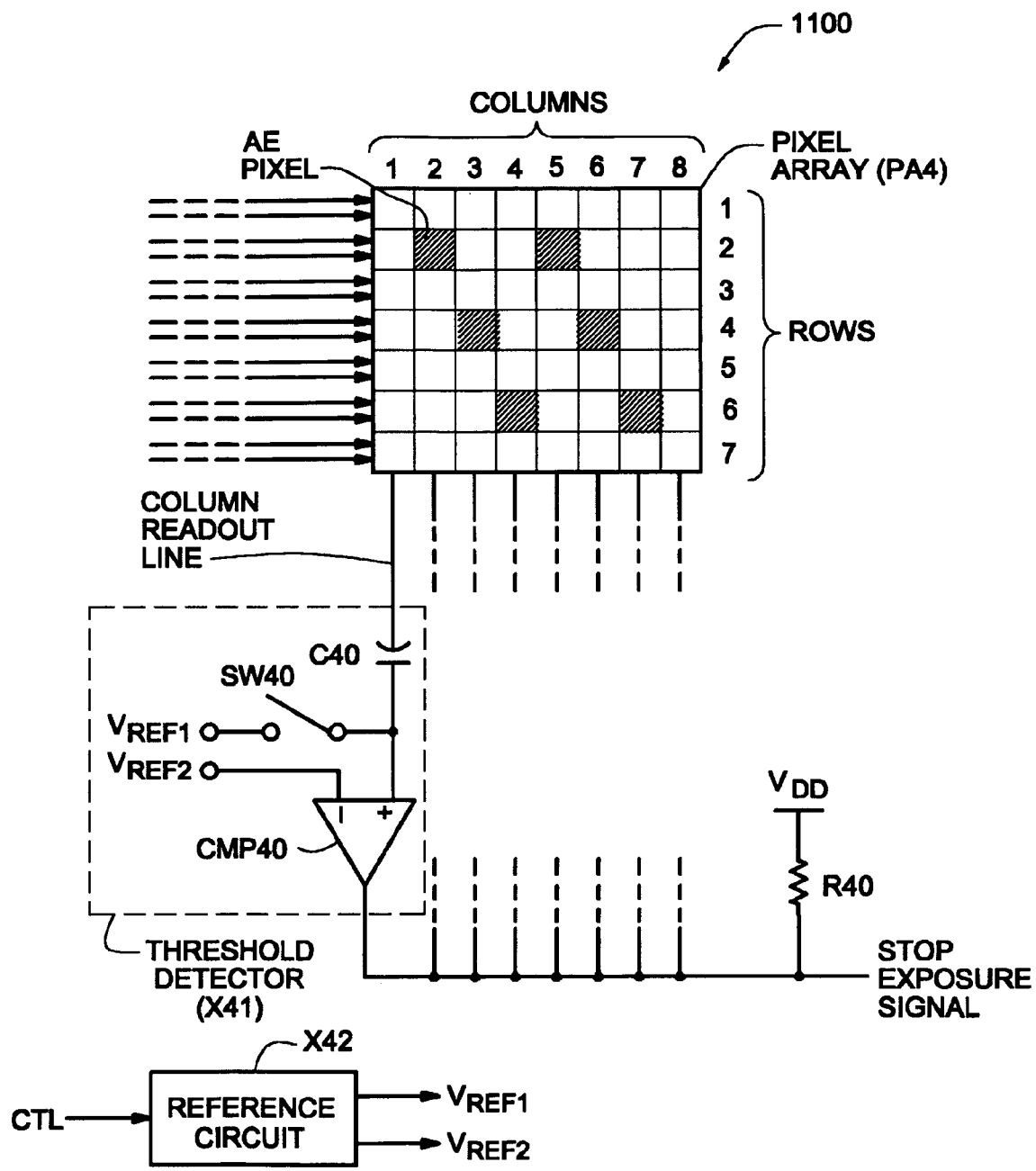
FIG. 4 is a schematic diagram of an exemplary threshold detector circuit that is arranged in an imaging system.

FIG. 4 is a schematic diagram of an exemplary threshold detector circuit (X41) that is arranged in an imaging system (400), in accordance with the present invention.

Imaging system 400 includes a pixel array (PA4) that is arranged into a set of rows (i.e., 7 rows) and columns (i.e., 8 columns). The pixel array (PA4) includes a selected group of pixels (AE pixels) that are used for automatic exposure control. As illustrated in FIG. 4, AE pixels are located in columns 2–7, at rows 2, 4, 6, 2, 4, and 6, respectively. As in FIG. 1, row reset lines and row select lines are configured to reset and select a respective one of the rows. When a row select line is selected, each pixel in the selected row is coupled to a respective one of the column readout lines. The column readout line for column 2 is coupled to a threshold detector X41 as illustrated in FIG. 4. Similarly, columns readout lines for columns 3–7 are coupled to a respective threshold detector (not shown) that is the same or similar to X41. Each of the threshold detectors includes an output that is coupled to the stop exposure signal line. A pull-up resistor (R40) is coupled between the high power supply and the stop exposure signal line. A reference circuit (X42) is arranged to provide two reference voltages (VREF1, VREF2) in response to a control signal (CTL).

Imaging system 400 is similar to imaging system 100 illustrated in FIG. 1. However, each one of peak signal detector circuits X6–X8 is replaced by a corresponding threshold detector such as threshold detector circuit X41 illustrated in FIG. 4. The functions of peak signal detector circuits X6–X8, scan circuit X9, peak signal detector circuit X10, and threshold detector circuit X11 are combined together into the series of threshold detector circuits (X41).

Threshold detector circuit X41 includes a comparator circuit (CMP40), a capacitor circuit (C40), and a switching circuit (SW40). A first reference voltage (VREF1) is coupled to a first input (i.e., the non-inverting input) of comparator circuit CMP40 when switching circuit SW40 is in a closed position, and decoupled from the first input of comparator circuit CMP40 when switching circuit SW40 is in an open position. A second reference voltage (VREF2) is coupled to a second input (i.e., the inverting input) of comparator circuit CMP40. Capacitor circuit C40 is coupled between a column readout line (i.e., the column readout line for column 2) and the first input of comparator circuit CMP40.

The output of comparator circuit CMP40 is coupled to the stop exposure signal line. The output of comparator circuit CMP40 may be configured as a wired OR, an open collector, or open drain type of output such that the stop exposure signal line is normally high until any of comparators circuit CMP40 in the threshold detectors exceeds the exposure threshold for the pixel array. Threshold detector X41 compares the signal level associated with the column readout lines to the exposure threshold. The stop exposure signal is set to a low logic level (i.e., logic 0) when any one of the threshold detector outputs indicates that the exposure threshold has been reached. The exposure threshold is arranged to ensure that the pixels in the pixel array are not overexposed.

The outputs of the hashed pixels in FIG. 4 (AE Pixels) are observed by the threshold detector circuits X41 to determine the appropriate exposure time. The operation of the threshold detector is described with reference to a reset time interval, an exposure time interval, and a readout time interval. During the reset time interval the pixel array is reset such that the pixels are initialized to an initialization voltage. During the exposure time interval the pixel array is exposed to reflected light that corresponds to the light reflected from the scene. During the readout time interval, the pixels from the pixel array are read out of the column readout lines such that the image data output is provided as described above with reference to FIG. 1.

Threshold detector circuits (X41) are arranged to monitor the column readout lines during the reset time interval. For example, the column readout line for column 2 is selected such that the column readout line provides a readout voltage (i.e., Vd−Vt) to the bottom plate of capacitance circuit C40. Since the photodiodes in the pixel array are not exposed to light during the reset time interval, the readout voltage corresponds to Vi−Vt. Switch SW40 is closed during the reset time interval such that the top plate of capacitance circuit C40 receives reference voltage VREF1. Switching circuit SW40 is opened at the end of the reset time interval such that the voltage that is stored in capacitance circuit C40 corresponds to (VREF1−Vi−Vt), relative to the top plate of capacitance circuit C40.

The exposure time interval is started after all of the pixels in the pixel array, and all of the AE pixel's reset levels that are stored in the corresponding threshold detectors, are reset. The pixel array is exposed to reflected light during the exposure time interval. The reflected light corresponds to light that is reflected from the objects in the scene. The pixel array may be exposed by opening a shutter means such as a mechanical shutter or an electronic shutter, or by activating a light source. The photocurrents in the pixels are integrated during the exposure time interval as previously described. The readout voltage of each pixel is observed by activating the corresponding row select lines. Each column readout line will have a readout voltage that corresponds to Vi−Vs−Vt, as previously described. Since the readout voltage is coupled to the bottom plate of the capacitance circuit (C40), the top plate of the capacitance circuit will have an associated voltage that corresponds to VREF1−Vs, where Vs is the signal voltage that is related to the integrated photocurrent as previously described.

The potential of the top plate of capacitor C40 is compared to the second reference voltage (VREF2) by comparator circuit CMP40. The output of comparator circuit CMP40 will change from a high logic level (logic 1) to a low logic level (logic 0) when the signal voltage (Vs) exceeds the difference between the first and second reference voltages. The exposure threshold for the threshold detector is determined by the difference between the first and second reference voltages.

The source follower in each pixel cell of the pixel array has a threshold voltage (Vt) that may be different from the threshold voltages of the other source followers. The differences between the threshold voltages of the source followers are a potential source of inaccuracies in detecting when a pixel cell has reached saturation. The threshold voltage (Vt) that is associated with the source followers is effectively eliminated by the above-described capacitance storage method, such that the signals provided to the non-inverting inputs of the comparators correspond to VREF1−Vs. The accuracy of the signals provided to the comparators is improved by eliminating the threshold voltages, resulting in improved exposure time accuracy.

In one embodiment, the exposure time interval is concluded when the exposure threshold is exceeded by any one of the comparator outputs. In another embodiment, the digital timing control circuit includes a timeout feature such that infinite exposure times are avoided. The exposure threshold may be statically set by the first and second reference voltages, or dynamically set by changing the second reference voltage during the integration time interval. The control signal (CTL) of the reference circuit may be used to control the first and second reference voltages to provide either the static or dynamic exposure threshold.

The exposure threshold may be set to a level corresponding to 100% saturation, or another level such as 80% or 90% of the saturation limit for the pixels. System latencies can be accounted for by setting the exposure threshold at a level below 100% saturation. Pixel cells in the pixel array can only be accessed a single row at a time in a CMOS array. The pixel cells continue to integrate incident light even though the particular pixel cells may not be currently selected as the active row. It is therefore possible that a particular pixel cell may exceed (i.e., overshoot) its saturation limit between subsequent scans of the row corresponding to the particular pixel cell. Overexposure of the particular pixel cell may result when the saturation limit for a pixel in the pixel array is exceeded such that poor image contrast is realized. Additionally, the brightest pixel in the pixel array may fail to be observed since the system observes a sub-sampling of the pixels in the pixel array. An overexposure margin is realized by stopping the exposure when the exposure threshold of the observed pixels reaches a level below 100% of their saturation limit (e.g., 80% of saturation). The dynamic range of the system is not detrimentally affected by reducing the exposure threshold of the system. For example, an exposure threshold corresponding to 80% of the saturation limit results in a loss of dynamic range of only 2 dB.

An analog front-end (AFE) circuit may be employed to adjust the image data output (see FIG. 1) for use with an analog-to digital converter (ADC) circuit. The exposure threshold of the system may need to be lowered to accommodate any increased signal gain from the AFE circuit. For example, the ADC circuit may have a maximum voltage of 2 Volts, and the pixels reach saturation when the corresponding image data output is 2 Volts. However, pixel response may be small in low light situations such that the exposure time is excessively long to reach saturation in the pixels. The AFE circuit may be arranged to increase the signal level of the image data output such that the signals provided to the ADC circuit reach a maximum level (e.g., 2V) even though the pixel cells have not reached saturation. The exposure threshold may be set to a level that is below 100% saturation by an amount that is inversely proportional to the gain of the AFE circuit. For example, the exposure threshold level may be set to half of the saturation level when the AFE circuit has a gain of two. Also, the exposure level may be set to a predetermined percentage of the desired exposure threshold level (e.g., 80%–90% of half of the saturation level) to allow for system latencies as previously described-above.

The readout time interval is started after the exposure time interval is concluded. The signals from the entire pixel array are processed during the readout time interval such that the image data output includes image signals corresponding to each pixel in the pixel array. Since the exposure of the pixel array is automatically adjusted to a saturation limit, the image data output corresponds to an image with improved contrast.

Figure 5:
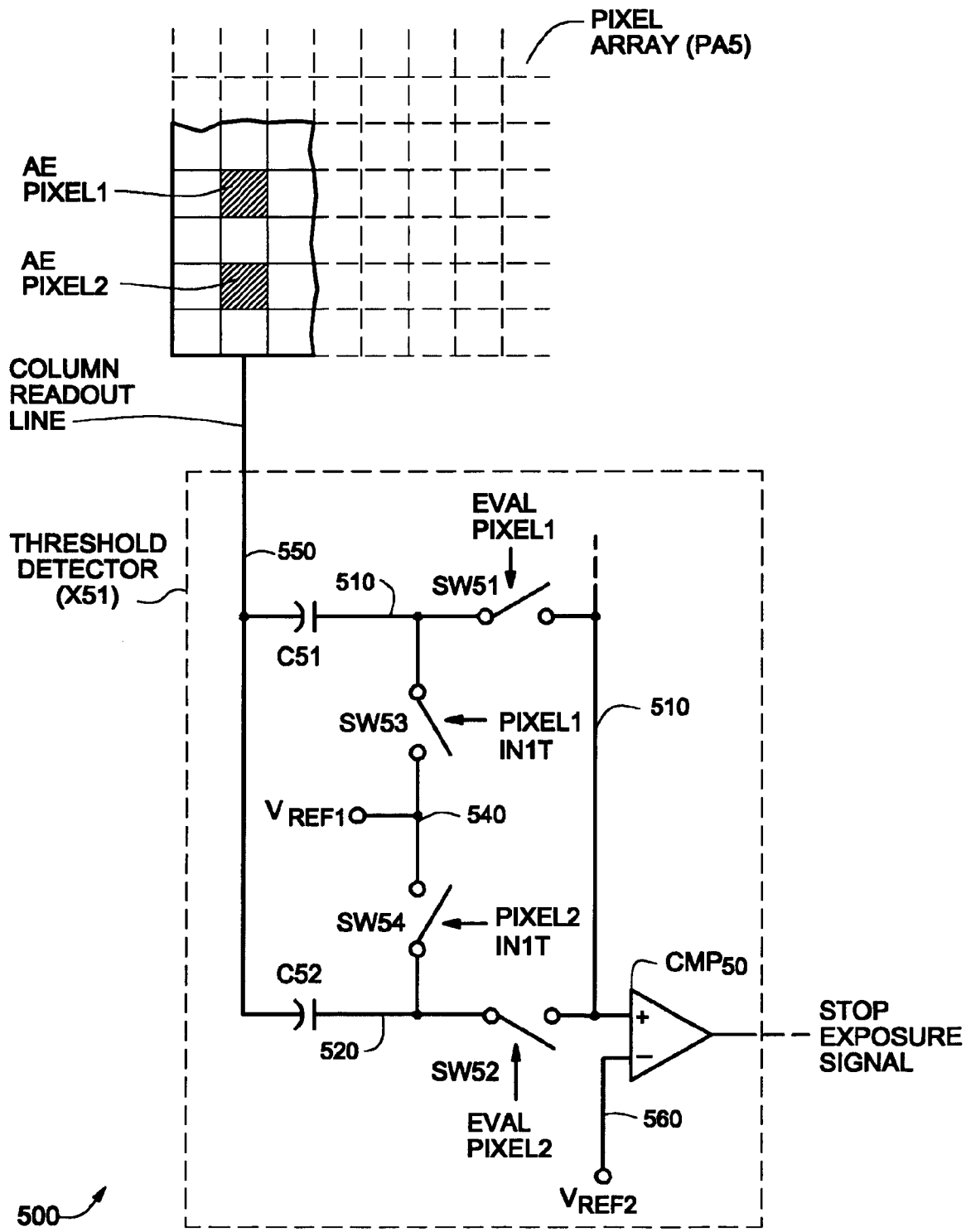
FIG. 5 is a schematic diagram of another exemplary threshold detector circuit that is arranged in an imaging system.

As illustrated in FIG. 4, each of the sub-sampled pixels (AE Pixels) is in a unique column with a corresponding threshold detector circuit (X41). However, it may be impracticable to utilize a separate threshold detector circuit (X41) for each column when a large pixel array is used. For example, a 512-column pixel array may have a sub-sample set of pixels that results in up to 100 threshold detector circuits. FIG. 5 illustrates a second example threshold detector that is arranged to reduce the component count necessary to implement the threshold detectors.

FIG. 5 is a schematic diagram of another exemplary threshold detector circuit (X51) that is arranged in an imaging system (500), in accordance with the present invention. Imaging system 500 includes a pixel array (PA5) that includes at least two pixels (i.e., AE pixels 1 and 2) that are located in the same column of the pixel array.

Threshold detector circuit X51 includes at least two capacitor circuits (C51–C52), at least four switching circuits (SW51–SW54), and a comparator circuit (CMP50). Each capacitance circuit (i.e., capacitance circuits C51 and C52) is associated with a corresponding pixel (i.e., AE pixels 1 and 2) and a particular column readout line. Capacitance circuit C51 has a bottom plate that is coupled to node 550, and a top plate that is coupled to node 510. Capacitance circuit C52 has a bottom plate that is coupled to node 550, and a top plate that is coupled to node 520. Switching circuit SW51 is coupled between nodes 510 and 530, and actuated in response to an EVAL PIXEL1 signal. Switching circuit SW52 is coupled between nodes 520 and 530, and actuated in response to an EVAL PIXEL2 signal. Switching circuit SW53 is coupled between nodes 510 and 540, and actuated in response to a PIXEL1 INIT signal. Switching circuit SW54 is coupled between nodes 520 and 540, and actuated in response to a PIXEL2 INIT signal. Comparator circuit CMP50 has a first input (i.e., a non-inverting input) that is coupled to node 530, a second input (i.e., an inverting input) that is coupled to node 560, and an output that is arranged to provide the stop exposure signal.

In operation, a first reference voltage (VREF1) is coupled to node 540, and a second reference voltage (VREF2) is coupled to node 560. Capacitance circuit C51, and switching circuit SW53 operate in a substantially similar manner as threshold circuit X41 in FIG. 4. Capacitance circuit C51 operates as a storage device that is arranged to sample the difference between a signal voltage that is associated with a first pixel (i.e., AE pixel 1) and the first reference voltage (VREF1). Similarly, capacitance circuit C52 and switching circuit SW54 are arranged to operate in a storage device that is arranged to sample the difference between a signal voltage that is associated with a second pixel (i.e., AE pixel 2) and the first reference voltage (VREF2). The EVAL PIXEL1 and EVAL PIXEL2 signals are responsive to the row select signals (see FIG. 1) corresponding to AE pixel 1 and AE pixel 2, respectively. Similarly, the PIXEL1 INIT and PIXEL2 INIT signals are responsive to the row reset signals (see FIG. 1) corresponding to AE pixel 1 and AE pixel 2, respectively.

Node 530 operates as a common-node that is selectively coupled to nodes 510 and 520. Switching circuits SW51 and SW52 are arranged such that a single comparator (CMP50) is multiplexed between evaluating the voltages associated with the top plates of capacitance circuits C51 and C52. The voltages associated with the capacitance circuits can only be evaluated when one of the EVAL PIXEL signals is asserted. In other words, at least one of the capacitance circuits must be coupled to the common node when the output of comparator circuit CMP50 is evaluated. Another circuit such as a latch, or some other circuit such as the digital timing control circuit is arranged to evaluate (or sample) the stop exposure signal such that the output of comparator CMP50 is only evaluated at appropriate times during the exposure time interval.

Additional capacitance and switching circuits may be added such that additional pixels may be evaluated. In one example, additional capacitance circuits are (e.g., C53, C54, . . . ) and additional switching circuits are provided such that additional AE pixels from the same column of the pixel array may be evaluated by the common comparator circuit. In another example, another column readout line is coupled to additional capacitance circuits, and additional switching circuits are provided such that the comparator circuit may evaluate additional AE pixels from a different column of the pixel array.

First Exemplary Procedural Flow

Figure 6A:
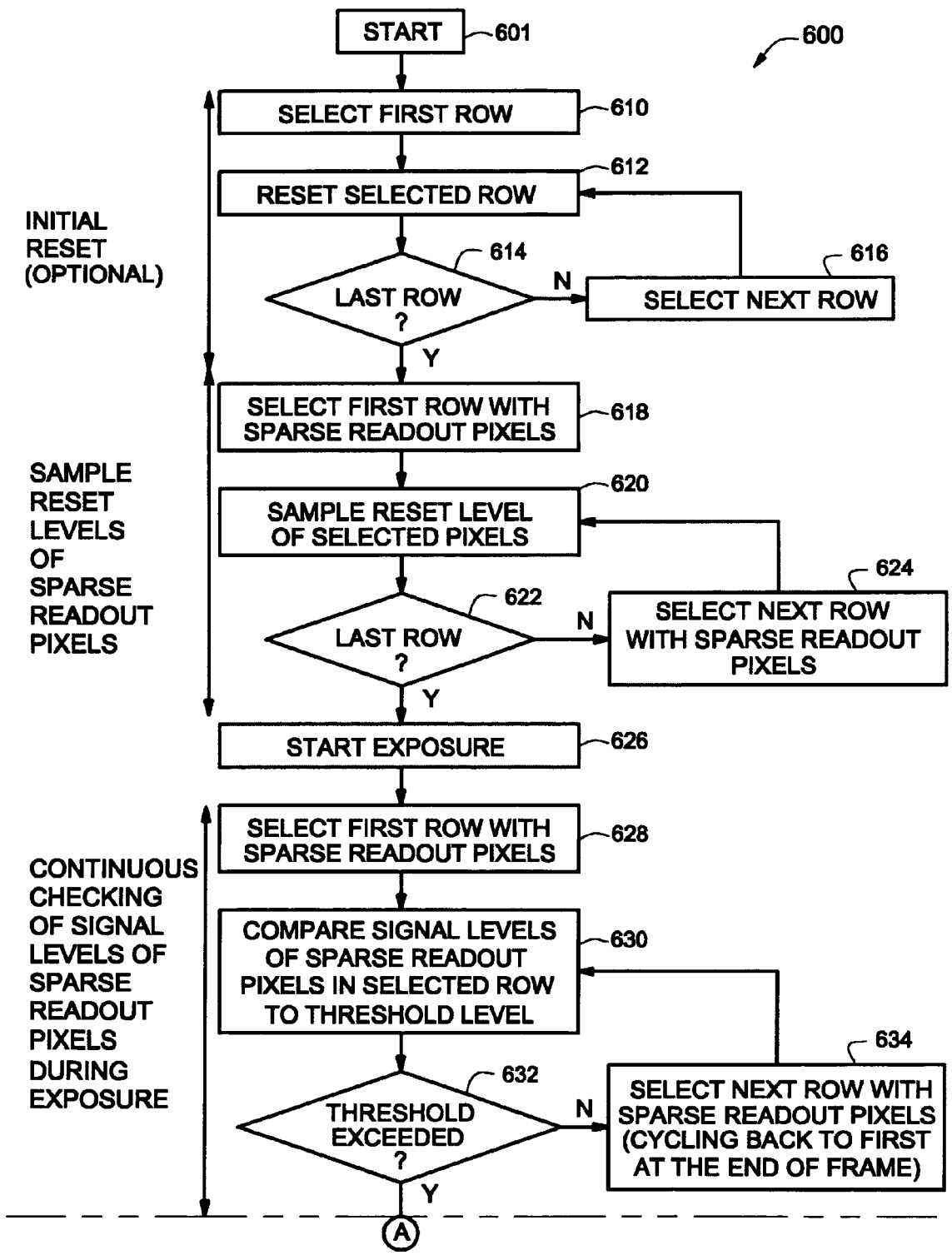
FIGS. 6A and 6B are procedural flow diagrams of an exemplary imaging system.
Figure 6B:
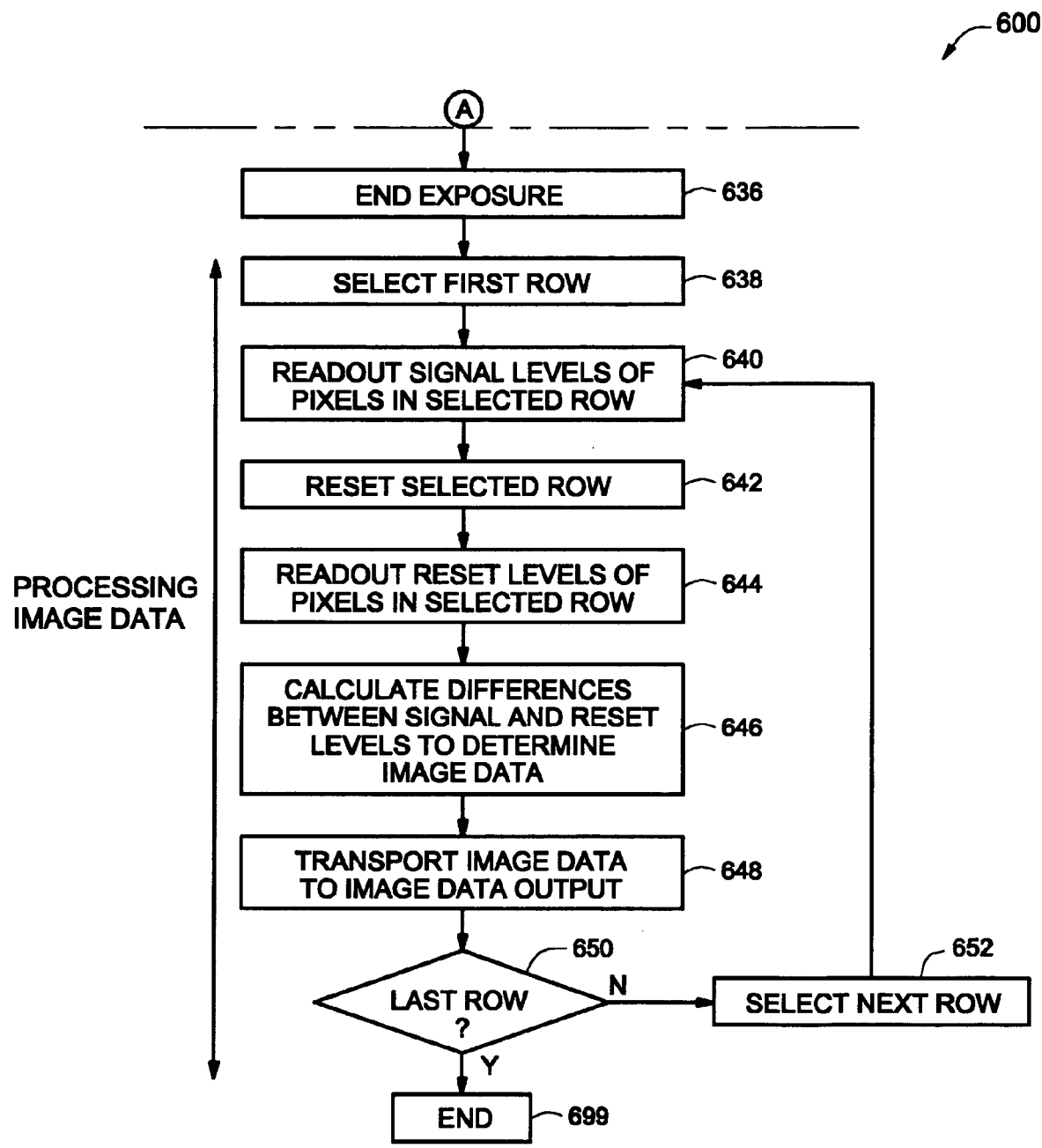

FIGS. 6A and 6B are procedural flow diagrams of the exemplary threshold detector such as that illustrated in FIG. 4.

Processing flows from block 601 (START) to block 610. At block 610, the first row of the pixel array is selected. Processing continues to block 612 where the selected row is reset. Continuing to decision block 614, the system evaluates the currently selected row to determine if the currently selected row is the last row in the pixel array. Processing flows from decision block 614 to block 616 when the additional rows in the pixel array need to be processed. At block 616 the next row in the pixel array is selected. Processing flows from block 616 to block 612. Processing continues from decision block 614 to block 618 after the last row in the pixel array has been processed.

At block 618, the system selects the first row that has a sparse readout pixel (or pixels). The sparse readout pixels correspond to the AE pixels such as that illustrated in FIGS. 1, 4, and 5. Continuing to block 620, the reset level for each sparse readout pixel is sampled. Processing flows to decision block 622, where the selected row is evaluated to determine if the selected row corresponds to the last row in the pixel array that includes sparse readout pixels (AE Pixels). Processing flows from decision block 622 to block 624 when additional rows need to be processed. At block 624, the next row in the pixel array that includes sparse readout pixels is selected. Processing flows from block 624 to block 620. Processing continues from decision block 622 to block 626 after the last row of sparse pixels has been processed.

At block 626, the exposure interval of the pixel array is started. Continuing to block 628, the system selects the first row that has a sparse readout pixel (or pixels). Continuing to block 630, the signal level for each selected sparse readout pixel is compared to a threshold level. Processing flows to decision block 632, where the selected row is evaluated to determine if any of the signals associated with the sparse readout pixels exceeds the threshold level. Processing flows from decision block 632 to block 634 when the threshold level is not exceeded. At block 634, the next row in the pixel array that includes sparse readout pixels is selected, cycling back to the first row when the end of the frame is reached. Processing flows from block 634 to block 630. Processing continues from decision block 632 to block 636 when the threshold level has been exceeded by at least one of the sparse readout pixels. At block 636, the exposure interval ends and the exposure of the pixel array is terminated.

Continuing to block 638, the first row of the pixel array is selected. Processing flows to block 640 where the signal levels of the pixels in the selected row are retrieved (or read-out). Proceeding to block 642, the selected row is reset. Continuing to block 644 the reset levels of the pixels in the selected row are retrieved. Flowing to block 646, image data for each pixel in the selected row is determined by calculating the difference between the reset level and the signal level for each pixel. Continuing to block 648, the image data from the selected row is transported to the image data output (see FIG. 1). Continuing to decision block 650, the currently selected row is evaluated to determine if the currently selected row is the last row in the pixel array. Processing flows from decision block 650 to block 652 when the additional rows in the pixel array need to be processed. At block 652 the next row in the pixel array is selected. Processing flows from block 652 to block 640. Processing continues from decision block 659 to block 699, where processing is terminated after the last row in the pixel array has been processed.

Blocks 610–616 comprise an initialization (or reset) process that is arranged to initialize the pixel array to a known reset condition. The initialization routine is an optional routine since the pixels in the pixel array are reset during the readout process at block 642.

Blocks 618–624 comprise a sampling process that is arranged to sample the reset levels of the sparse readout pixels. Although the above-described procedural flow includes a separate processing loop for the initialization process and the sampling process, the two processing loops may be combined into a single processing loop. For example, between block 612 and decision block 614 additional processing may be performed to determine if the currently selected row corresponds to a row that includes sparse readout pixels, and sampling the reset level for the sparse readout pixels. The sampling may be accomplished with a sampling circuit such as the threshold detectors described above.

Blocks 626–636 comprise an exposure process that is arranged to continuously check the signal levels of the sparse readout pixels during the exposure interval. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. The comparison step (block 630, 632) may be accomplished by any means for comparing such as comparators CMP40 and CMP50 illustrated in FIGS. 4–5, where the reset level of each selected pixel is accounted for in the comparison. Exposure may be stopped by at least one of closing a mechanical shutter, deactivating an electronic shutter, and deactivating a light source (e.g., an LED).

Blocks 638–652 comprise a frame readout process that is arranged to process and transfer an entire frame from the pixel array after the exposure interval is complete. The frame readout process may include coupling the column readout signals from the pixel array to a correlated double sampling circuit as previously described above. The image data signals may be further processed by additional circuitry (not shown) including, but not limited to an analog front-end circuit (AFE), a gain scaling circuit, an offset adjustment circuit, and an analog-to-digital converter (ADC). Processing block 610–652 may be restarted as required to capture additional images.

Second Exemplary Procedural Flow

Figure 7A:
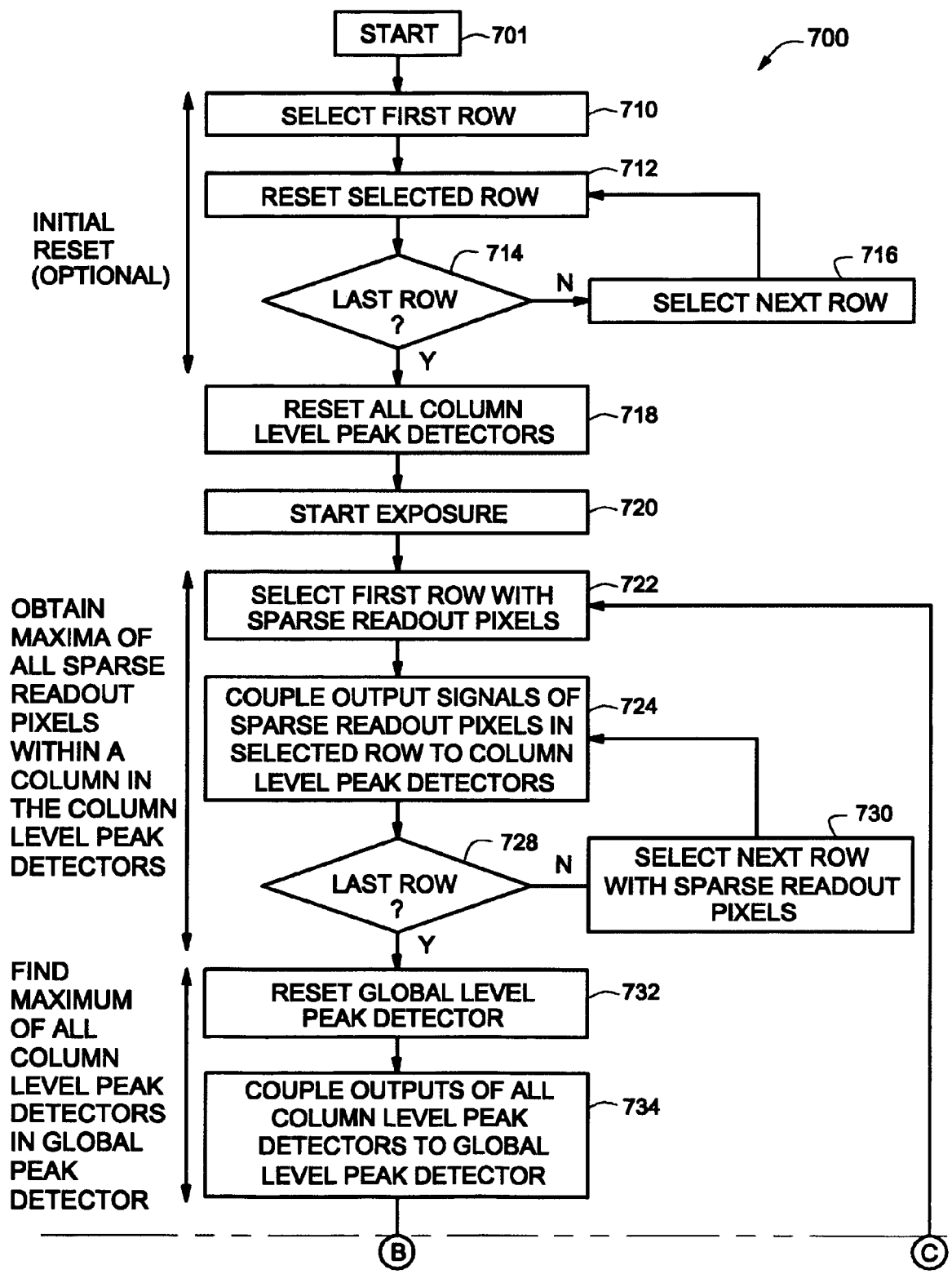
FIGS. 7A and 7B are procedural flow diagrams of another exemplary imaging system.
Figure 7B:
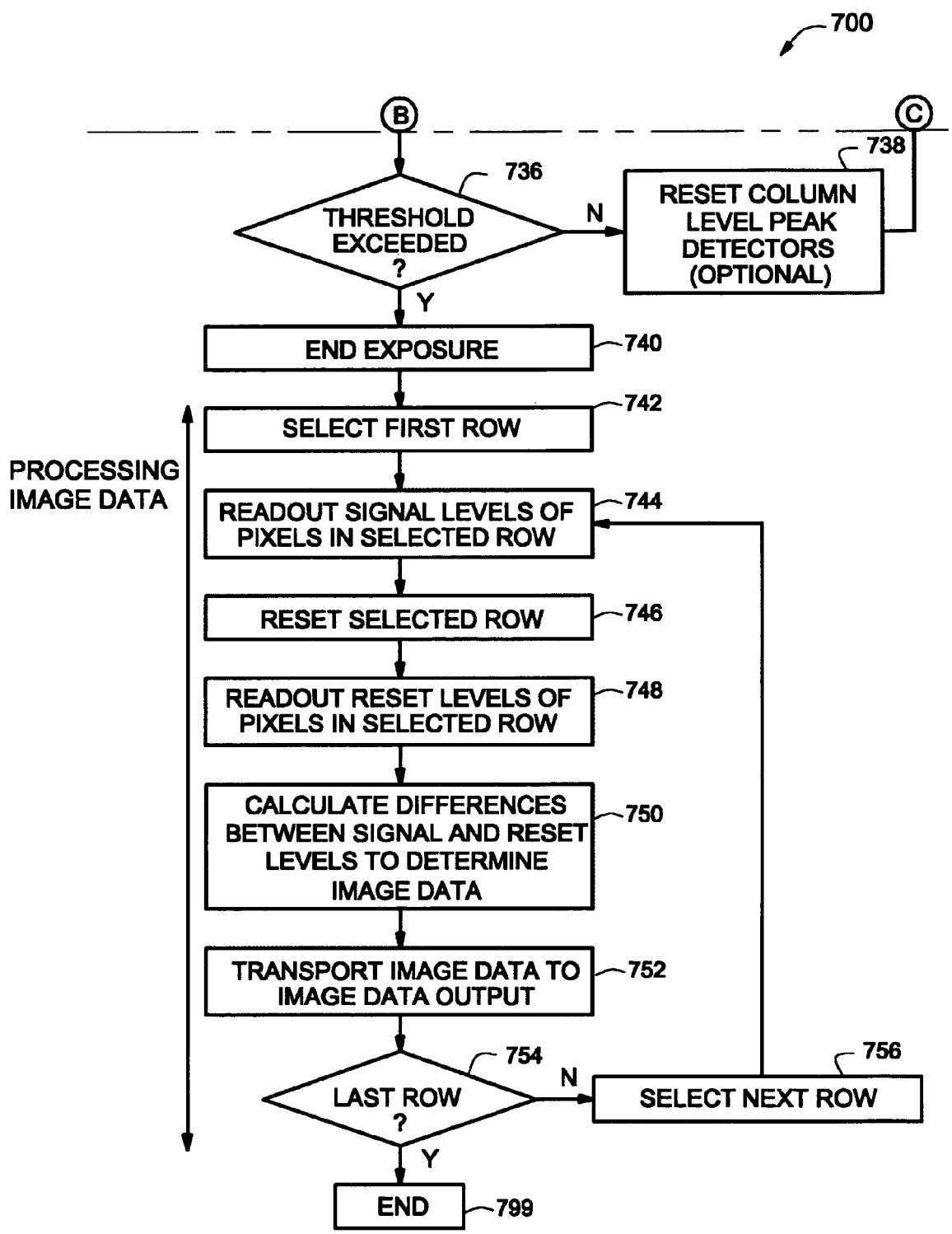

FIGS. 7A and 7B are procedural flow diagrams of an imaging system as illustrated in FIG. 1, in accordance with the present invention.

Beginning at block 710, the first row of the pixel array is selected. Processing continues to block 712 where the selected row is reset. Continuing to decision block 714, the system evaluates the currently selected row to determine if the currently selected row is the last row in the pixel array. Processing flows from decision block 714 to block 716 when the additional rows in the pixel array need to be processed. At block 716 the next row in the pixel array is selected.

Processing flows from block 716 to block 712. Processing continues from decision block 714 to block 718 after the last row in the pixel array has been processed.

At block 718, the column level peak signal detectors are reset. Continuing to block 720, the exposure interval of the pixel array is started. The first row that has a sparse readout pixel (or pixels) is selected at block 722. Continuing to block 724, the signal level for each selected sparse readout pixel (i.e., AE pixel) is coupled to a respective one of the peak signal detectors (i.e., peak signal detectors X6–X8), where each peak signal detector is arranged to detect the signal associated with a column readout line. Processing flows to decision block 728, where the system evaluates the currently selected row to determine if the currently selected row is the last row in the pixel array that includes sparse readout pixels. Processing flows from decision block 728 to block 730 when the additional rows in the pixel array with sparse readout pixels need to be processed. At block 730 the next row in the pixel array that has sparse readout pixels (i.e., AE pixels) is selected. Processing flows from block 730 to block 724. Processing continues from decision block 728 to block 732 after the last row of sparse pixels has been processed.

The global level peak signal detector (i.e., peak signal detector X10) is reset at block 732. Continuing to block 734, the outputs of the column level peak signal detectors (i.e., peak signal detectors X6–X8) are coupled to the global level peak signal detector (i.e., peak signal detector X10). The global level peak signal detector provides an output that is evaluated to determine if a threshold level has been exceeded, at decision block 736. Processing continues from decision block 736 to block 738 when the threshold level has not been exceeded by the output of the global level peak signal detector. Otherwise, processing flows from decision block 736 to block 740. At block 738, the column level peak signal detectors are reset, and processing continues to block 722. The exposure interval of the pixel array is terminated at block 740, and processing continues to block 742.

At block 742, the first row of the pixel array is selected. Processing flows to block 744 where the signal levels of the pixels in the selected row are retrieved (or read-out). Proceeding to block 746, the selected row is reset. Continuing to block 748 the reset levels of the pixels in the selected row are retrieved. Flowing to block 750, image data for each pixel in the selected row is determined by calculating the difference between the reset level and the signal level for each pixel. Continuing to block 752, the image data from the selected row is transported to the image data output (see FIG. 1). Continuing to decision block 754, the currently selected row is evaluated to determine if the currently selected row is the last row in the pixel array. Processing flows from decision block 754 to block 756 when the additional rows in the pixel array need to be processed. At block 756, the next row in the pixel array is selected. Processing flows from block 756 to block 744. Processing continues from decision block 754 to block 799, where processing is terminated after the last row in the pixel array has been processed.

Blocks 710–716 comprise an initialization (or reset) process that is arranged to initialize the pixel array to a known reset condition. The initialization routine is an optional routine since the pixels in the pixel array are reset during the readout process at block 746.

Blocks 720–740 comprise an exposure process that is arranged to continuously check the signal levels of the sparse readout pixels, via peak signal detectors, during the exposure interval. Blocks 722–730 comprise a column peak detection process that is arranged to find the maximum peak level of the sparse readout pixels in each corresponding column. Blocks 732–734 comprise a maximum peak detection process that is arranged to find the maximum peak level of the column level peak signal detectors. Exposure may be started by an exposure means such as, for example, at least one of opening a mechanical shutter, activating an electronic shutter, and activating a light source (e.g., an LED). Each pixel in the array receives light that is reflected from the scene, while the exposure means is actuated. Exposure may be terminated by at least one of closing a mechanical shutter, deactivating an electronic shutter, and deactivating a light source (e.g., an LED). Block 738 is an optional block, since the signals in the peak signal detectors are reset at block 718, and the peak levels can only increase with time such that the maximum detected level in each successive scan can is larger than the maximum detected level in a previous scan. Similarly, block 732 may be eliminated when the global level peak signal detector is reset prior to exposure (i.e., in block 718).

Blocks 740–756 comprise a frame readout process that is arranged in a substantially similar manner as that described in FIGS. 6A and 6B. See the discussion with respect to blocks 638–652 for further details.

In one embodiment of the present invention, the sparse readout pixels discussed above correspond to a predetermined group of pixels from the pixel array. For example, the pixel array may be organized such that at every tenth column and at every tenth row a sparse readout pixel (or automatic exposure pixel) is located.

In another example, the sparse readout pixels correspond to a group of pixels that are randomly or pseudo-randomly selected at predetermined time intervals. For example, the group of sparse readout pixels from the pixel array may be randomly chosen in-between processing cycles (e.g., after each successive frame is processed). It is possible that a bright spot exists in the image at a location that is not observed by a sparse readout pixel. By randomly choosing the sparse readout pixels in each successive frame it is more likely that a bright spot in the image will be detected and overexposure will be avoided. The randomization of the sparse readout pixels may be handled periodically before or after each successive frame, or alternatively before/after a number of frames is processed as may be desired.

Operation of Exemplary Threshold Detectors

Figure 8:
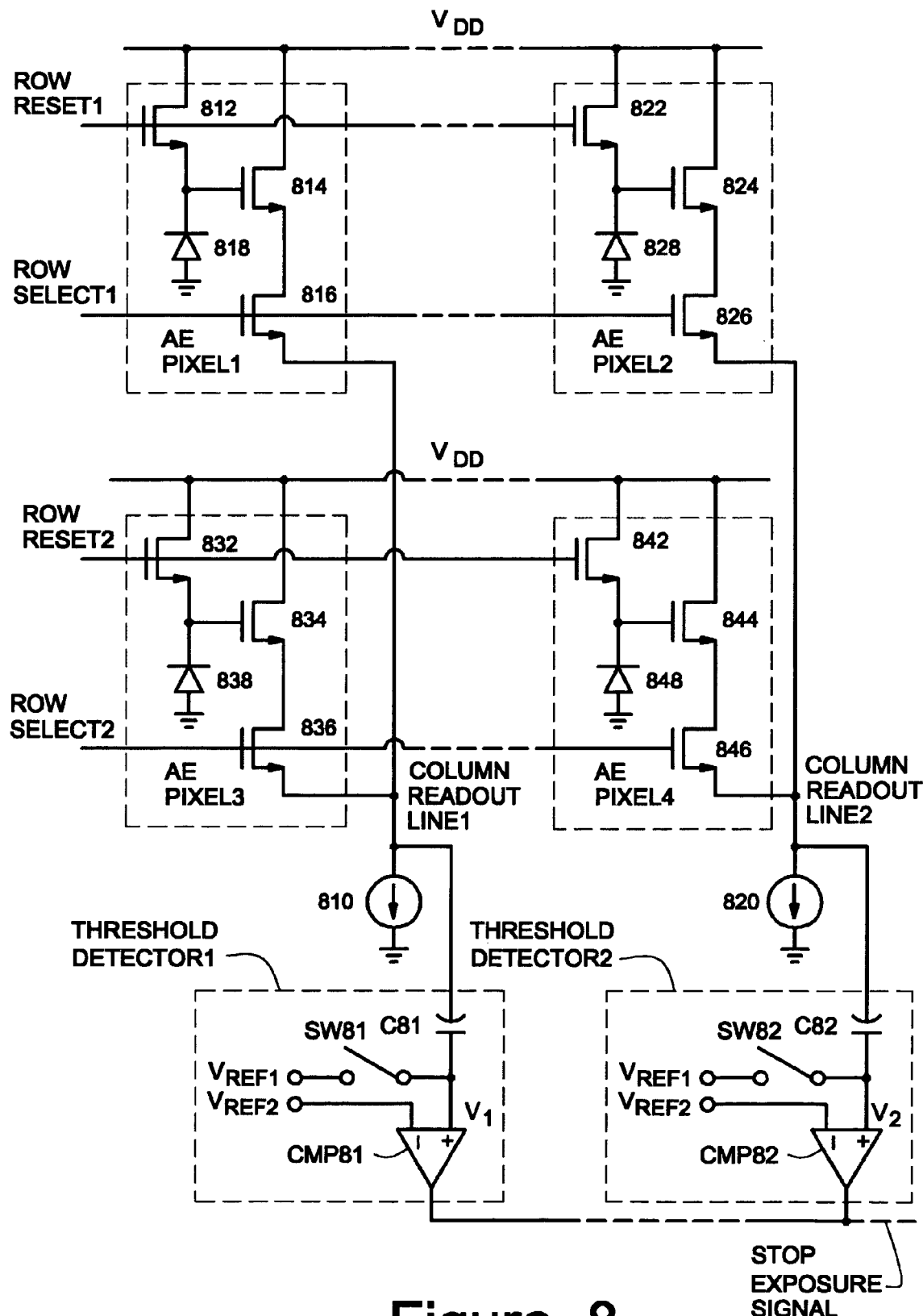
FIG. 8 is a schematic diagram of two exemplary threshold detector circuits that are arranged in an imaging system.

FIG. 8 is a schematic diagram of two exemplary threshold detector circuits that are arranged in an imaging system in accordance with the present invention. The imaging system includes two threshold detectors (Threshold Detector1, Threshold Detector2), two current sources (810, 820), and a pixel array (not shown) that includes four pixel cells (AE Pixel1, AE Pixel2).

AE Pixel 1 includes transistors 812, 814, 816, and photodiode 818. AE Pixel 2 includes transistors 822, 824, 826, and photodiode 828. AE Pixel 3 includes transistors 832, 834, 836, and photodiode 838. AE Pixel 4 includes transistors 842, 844, 846, and photodiode 848. AE Pixels 1–4 are arranged in a substantially similar manner as that described with respect to FIG. 2. Threshold Detector1 includes a capacitance circuit C81, switching circuit SW81, and comparator CMP81, which are arranged in a substantially similar manner as that described with respect to threshold detector X41 from FIG. 4. Similarly, Threshold Detector2 includes a capacitance circuit C82, switching circuit SW82, and comparator CMP82, which are also arranged in a substantially similar manner as that described with respect to threshold detector X41 from FIG. 4. AE Pixels 1 and 2 are responsive to Row Reset1 and Row Select1, while AE Pixels 3 and 4 are responsive to Row Reset2 and Row Select2. AE Pixels 1 and 3 are arranged to provide readout signals on column readout line 1 when selected, while AE Pixels 3 and 4 are arranged to provide readout signals on column readout line 2. Current sources 810 and 820 are coupled to column readout line1 and column readout line2, respectively.

Threshold Detector1 and Threshold Detector2 each include an input that is coupled to column readout line1 and column readout line2, respectively, and an output that is coupled to a stop exposure signal line. By sharing a common output (the stop exposure line), the threshold detectors are arranged to operate in parallel. The stop exposure line depicted in FIG. 8 is an active low signal such that the exposure of the pixel array is stopped when the stop exposure line corresponds to a low logic signal.

Figure 9:
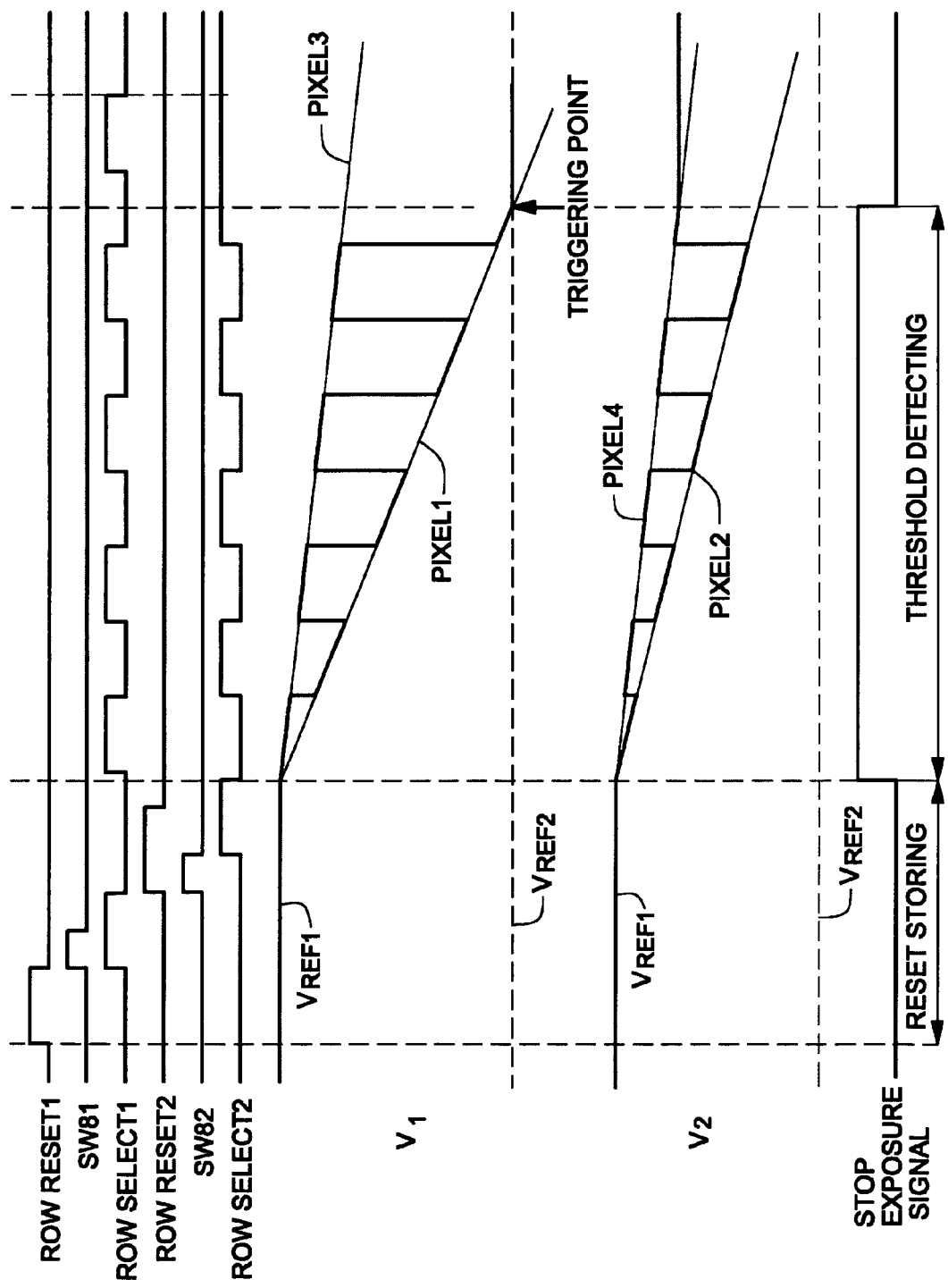
FIG. 9 is a timing diagram for the two exemplary threshold detector circuits from FIG. 8.

FIG. 9 is a timing diagram for the two exemplary threshold detector circuits from FIG. 8. The threshold detector circuits include at least a two operating modes: a reset-storing mode, and a threshold-detecting mode. For the discussion that follows below, AE Pixel is exposed by a brighter light signal than that of AE Pixel2–AE Pixel4.

Reset-Storing Mode

During the reset-storing mode, the stop exposure signal is set to low such that the pixel array is not exposed. The reset time interval for the reset-storing mode begins when the first row is reset, and ends after the last row is selected.

Row Reset1 pulses high during a first portion of the reset time interval such that photodiodes 818 and 828 in AE Pixel1 and AE Pixel 2 are reset and a charge is stored on the charge storage nodes (the gate of transistors 814, 824) as previously described. Switch SW81 is actuated such that the top plate of capacitance circuit C81 is initialized to VREF1 during a second portion of the reset time interval. AE Pixel3 and AE Pixel4 are reset when Row Reset2 is asserted during a third portion of the reset time interval. Switch SW82 is actuated such that the top plate of capacitance circuit C81 is initialized to VREF1 during a fourth portion of the reset time interval. Thus, V1 and V2 correspond to VREF1 at the end of the reset time interval.

Row Select1 is pulsed high after the photodiodes are initialized to their respective reset levels, such that readout signals from AE Pixel1 and AE Pixel3 are coupled through column readout line1 to the bottom plate of capacitance circuit C81. Similarly, Row Select2 is pulsed high and readout signals from AE Pixel 2 and AE Pixel4 are coupled though column readout line2 to the bottom plate of capacitance circuit C82 during the second and fourth portions of the reset time interval, respectively. At the end of the reset time interval, capacitance circuits C81 and C82 store the corresponding reset levels of the pixels as referenced to VREF1.

Threshold-Detecting Mode

During the threshold-detecting mode, the stop exposure signal is set to high such that the pixel array is exposed, and a signal corresponding to the light intensity is provided by the photodiodes. The exposure time interval for the threshold-detecting mode begins after the conclusion of the reset-time interval, and ends when a trigger point is found or when the exposure time interval exceeds a predetermined time limit.

The row select signals (row select1 and row select2) are periodically activated such that the comparators evaluate the readout signals from each corresponding pixel. A first readout signal from AE Pixel1 is coupled through column readout line1 to capacitance circuit C81 while row select1 is active. A second readout signal from AE Pixel2 is coupled through column readout line2 to capacitance circuit C88 while row select1 is active. A third readout signal from AE Pixel3 is coupled through column readout line1 to capacitance circuit C81 while row select2 is active. A fourth readout signal from AE Pixel4 is coupled through column readout line2 to capacitance circuit C82 while row select2 is active. Voltage V1 changes in response to changes in the signal from column readout line1. Comparator CMP81 monitors the signal that is provided by photodiodes 818 and 838 by monitoring voltage V1. Similarly, voltage V2 changes in response to changes in the signal from column readout line2. Comparator CMP82 monitors the signal that is provided by photodiodes 828 and 848 by monitoring voltage V2.

At the end of the threshold-detecting mode, voltage V1 approaches VREF2, and voltage V2 is higher than VREF2. Since at least one of the comparators (CMP81) provides a low signal, the stop exposure signal is forced to a low logic level. Comparator CMP81 triggers the assertion of the stop exposure signal when voltage V1 drops below VREF2 at the triggering point. The stop exposure signal is used to deactivate the exposure of the pixel array as previously described.

Second Exemplary Imaging System

Figure 10:
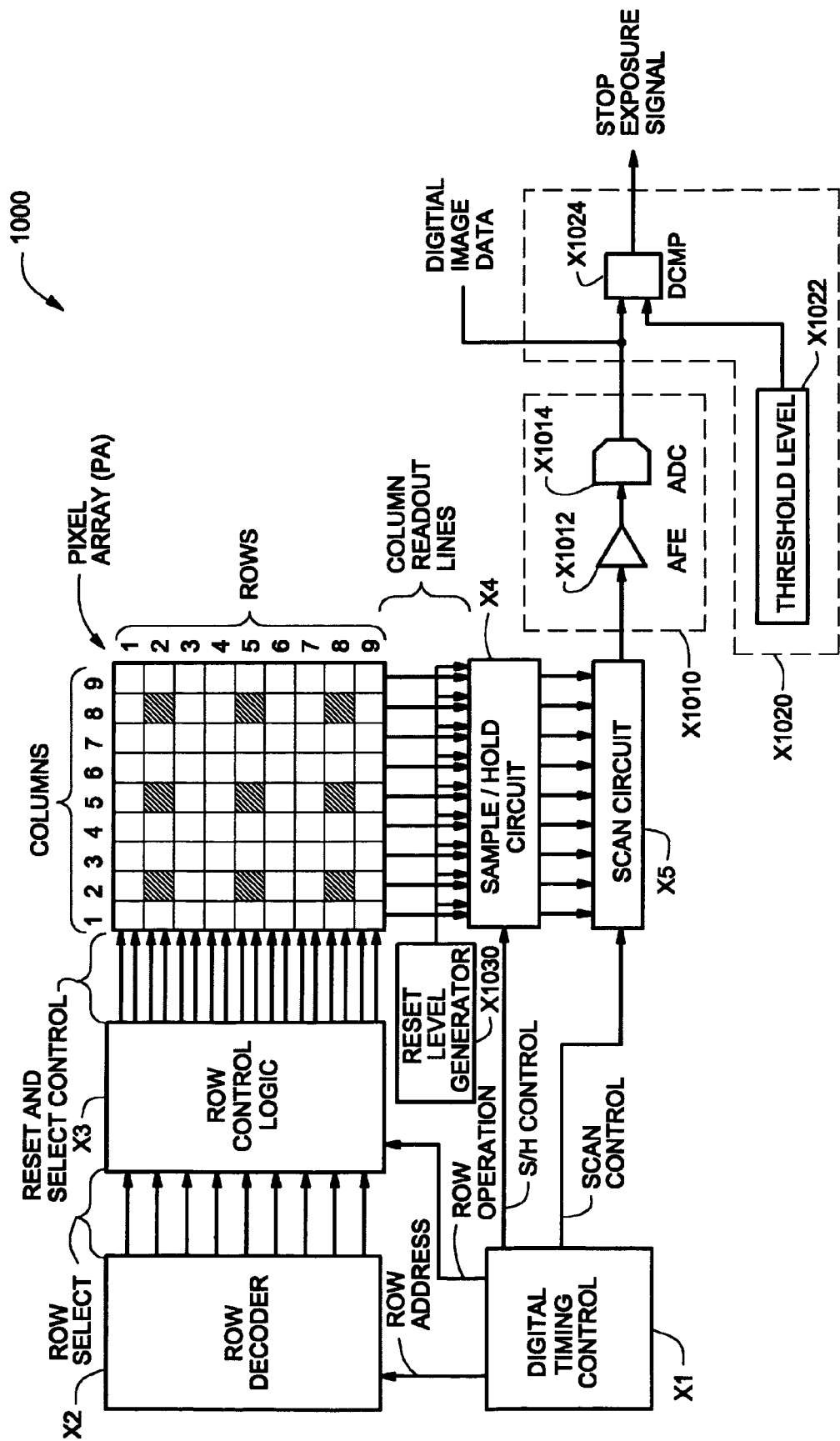
FIG. 10 is a schematic diagram of a second exemplary imaging system.

FIG. 10 shows another exemplary imaging system (1000) that includes automatic exposure control that is arranged in accordance with the present invention. Imaging system 1000 is similar to imaging system 100 from FIG. 1. Like components from FIG. 1 are labeled identically in FIG. 10, and operate in a similar manner to that already discussed above.

The pixels in pixel array PA in FIG. 10 are activated as previously described with respect to FIG. 1. Imaging system 1000 differs from imagining system 100 in that the functions of peak signal detectors X6–X8, scan circuit X9, peak signal detector X10, and threshold detector X11 are digitally processed as will be described below.

Imaging system 1000 includes pixel-processing circuitry that that is divided into an analog processing portion (X1010) and a digital processing portion (X1020). The output of scan circuit X5 is coupled to analog processing portion X1010. The analog processing portion of the pixel processing circuitry includes an optional analog front end (AFE, X1012) and an analog-to-digital converter (ADC, X1014). AFE X1012 is arranged to provide a gain and/or an offset to received signals such that the input to ADC X1014 is properly adjusted. ADC X1014 converts received analog signals into a digital image data. The digital processing portion (X1020) of the pixel processing circuitry includes a threshold level generator (X1022) and a digital comparator (DCMP, X1024). The threshold level generator (X10122) is arranged to provide a digital code that corresponds to a particular exposure limit as previously described with respect to FIGS. 1–9. DCMP X1024 compares the digital image data to the exposure limit.

The functions of the digital comparator (X1024) and the threshold level generator may be provided by any appropriate digital electronic circuitry, including but not limited to a programmable logic array (PLA), a microprocessor, a microcontroller, and the like. Additionally, the functions of ADC X1014 and the digital processing portion (X1020) of the pixel processing circuitry may be combined in a microcontroller.

As previously described, the reset level associated with a column readout of a pixel cell corresponds to (VDD–Vt) or (VDD–2*Vt). The pixel processing circuitry is arranged to continuously monitor the digital image data to determine when any sampled pixel exceeds the exposure threshold. However, the pixels in the pixel array may not be reset until the end of the exposure interval for a non-destructive readout. In this example, the sample/hold circuit X4 does not sample the reset level until the exposure time interval has expired such that the reset levels are not accounted for in evaluating each pixel in the digital image signal. Reset level generator X1030 is arranged to provide a reference voltage to sample/hold circuit X4 such that the effect of the offset in the signal is reduced. For example, a diode connected MOSFET can be arranged to provide a reference voltage corresponding to roughly (VDD−Vth), where Vth corresponds to the threshold voltage of the MOSFET. The threshold voltage (Vth) of the MOSFET is arranged to approximate the threshold voltage (Vt) from the pixel cells. Since the threshold voltage of the MOSFET may not be exactly the same as the reset level for the pixels, fixed pattern noise will result such that a small error is included in the sample/hold circuit output.

Third Exemplary Imaging System

Figure 11:
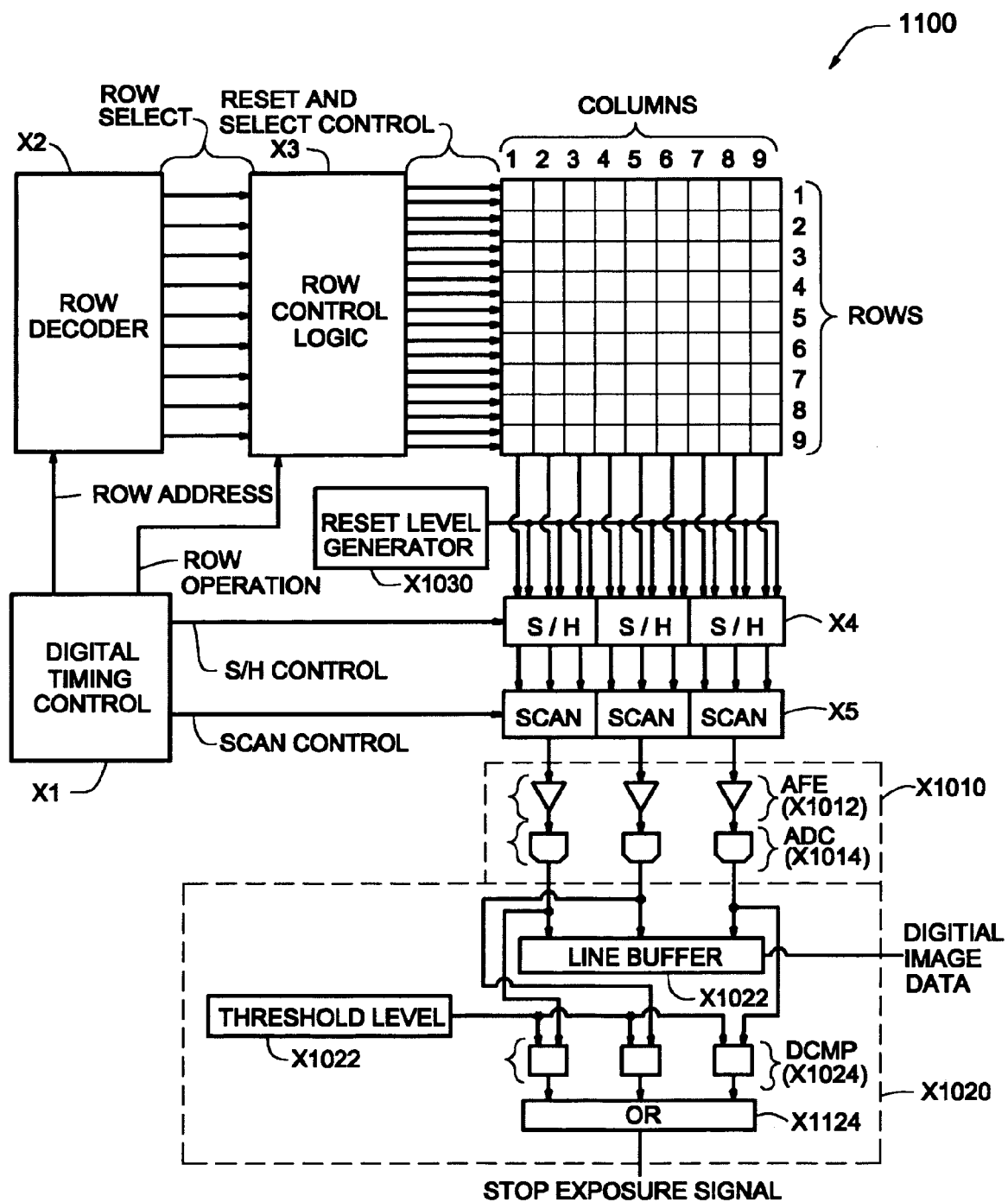
FIG. 11 is a schematic diagram of a third exemplary imaging system.

FIG. 11 shows still another exemplary imaging system (1100) that includes automatic exposure control that is arranged in accordance with the present invention. Imaging system 1100 is similar to imaging system 100 from FIG. 1, and also similar to imaging system 1000 described wit reference to FIG. 10. Like components from FIG. 1 and FIG. 10 are labeled identically in FIG. 11, and operate in a similar manner to that already discussed above.

Imaging system 1100 differs from imaging system 1000 in that pixel processing circuitry in FIG. 11 is arranged to process multiple signals in a parallel fashion. For example, FIG. 11 illustrates that scanner X5 has three output signals that are coupled to respective analog front-end circuits (X1012), which in turn provide analog signals to respective analog-to-digital converter circuits (X1014). The output from ADC circuits X1014 are provided to data signals to a line buffer (X1122). Line buffer X1122 is arranged to reorder the data signals, and provides the digital image data signal as an output. Each digital comparator circuit (X1024) is arranged to receive a respective one of the data signals from the ADCs (X1014), and the digital code that corresponds to the exposure limit. The outputs of the digital comparator circuits (X1024) are provided to a logical OR circuit (X1124) such that the stop exposure signal is asserted when any one of the digital comparator circuits asserts its respective output signal.

Fourth Exemplary Imaging System

Figure 12:
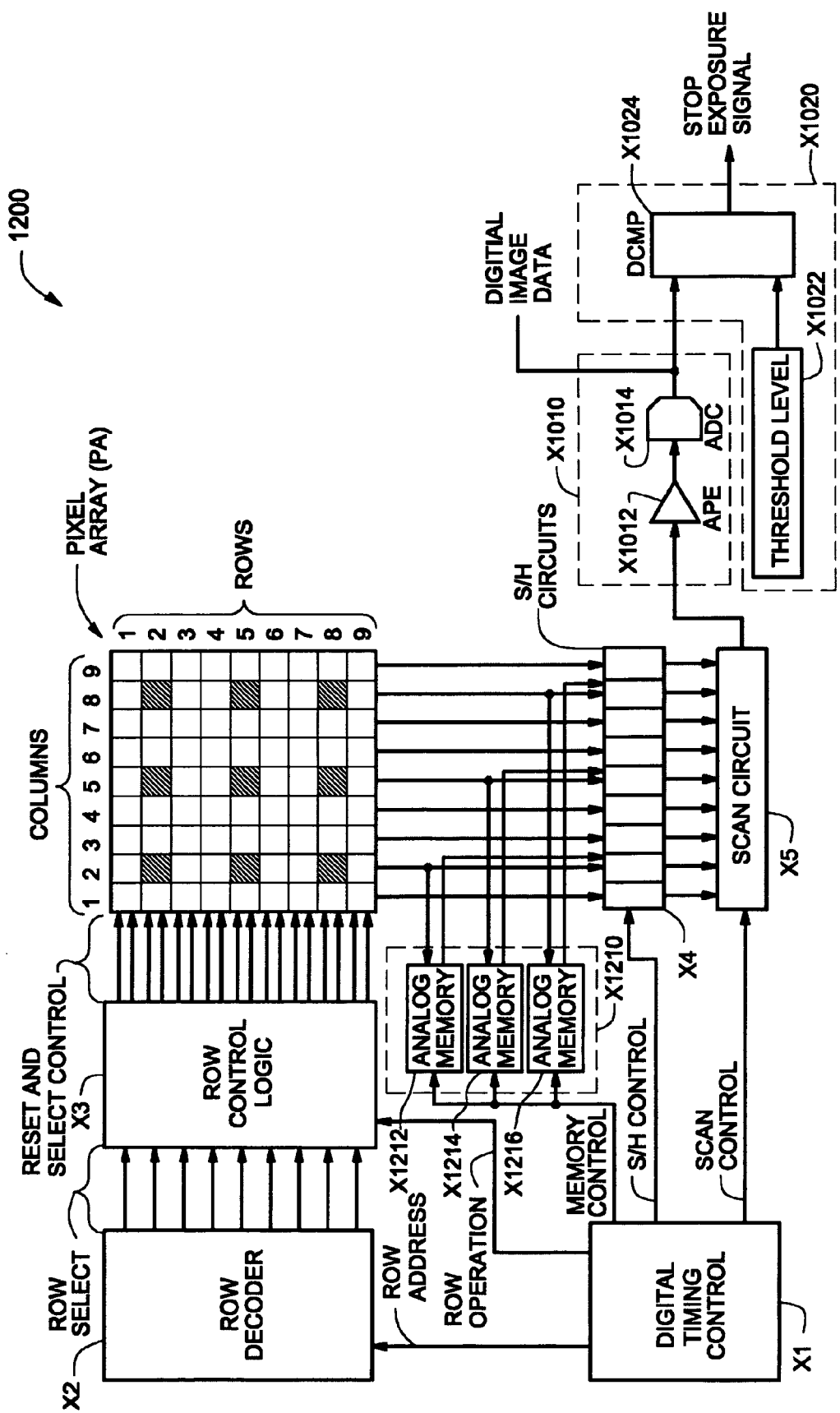
FIG. 12 is a schematic diagram of a fourth exemplary imaging system.

FIG. 12 shows yet another exemplary imaging system (1200) that includes automatic exposure control that is arranged in accordance with the present invention. Imaging system 1200 is similar to imaging system 100 from FIG. 1, and also similar to imaging system 1000 described wit reference to FIG. 10. Like components from FIG. 1 and FIG. 10 are labeled identically in FIG. 12, and operate in a similar manner to that already discussed above.

Imaging system 1200 differs from imaging system 1000 in that a reset memory circuit (X1210) is included in FIG. 12. The reset memory circuit (X1210) includes multiple analog memory circuits (e.g., X1212, X1214, X1216). The analog memory circuits (e.g., X1212, X1214, X1216) are arranged to sample the reset levels associated with the AE pixels corresponding to their respective column readout lines (e.g., columns 2, 5, 8). For example, the first analog memory circuit (X1212) is arranged to sample the reset levels for the AE pixels associated with column readout line 2, rows 2, 5, and 8.

As discussed above with respect to FIG. 10, fixed pattern noise may result when a mismatch exists between the true reset level of the pixels in the pixel array, and the reference voltage that is provided by the reset level generator (X1030). The automatically adjusted exposure time of the pixel array may be improper due to the fixed pattern noise such that the exposure time gives poor image quality. To prevent these problems, the reset memory circuit (X1210) is provided between the pixel array and the sample/hold circuits. The analog memory has a similar function as the capacitor circuits illustrated previously with respect to FIG. 4.

During the initial reset of the pixel array (the reset time interval), the analog memory circuits sample the reset levels of the AE pixels. The first analog memory circuit (X1212) samples the reset levels of the pixels associated with column 2, at rows 2, 5, and 8. The second analog memory circuit (X1214) samples the reset levels of the AE pixels associated with column 5. The third analog memory circuit (X1216) stores the reset levels of the AE pixels associated with column 8. During the exposure time interval, the sample/hold circuits sample the signal levels from the pixels and the reset levels from the analog memory circuits, such that the read out of the pixel array is non-destructive and has improved measurement accuracy. FIG. 12 is the same as FIG. 10 with the addition of Vt-mismatch cancellation, similar to that described-above with respect to FIG. 4.

Fifth Exemplary Imaging System

Figure 13:
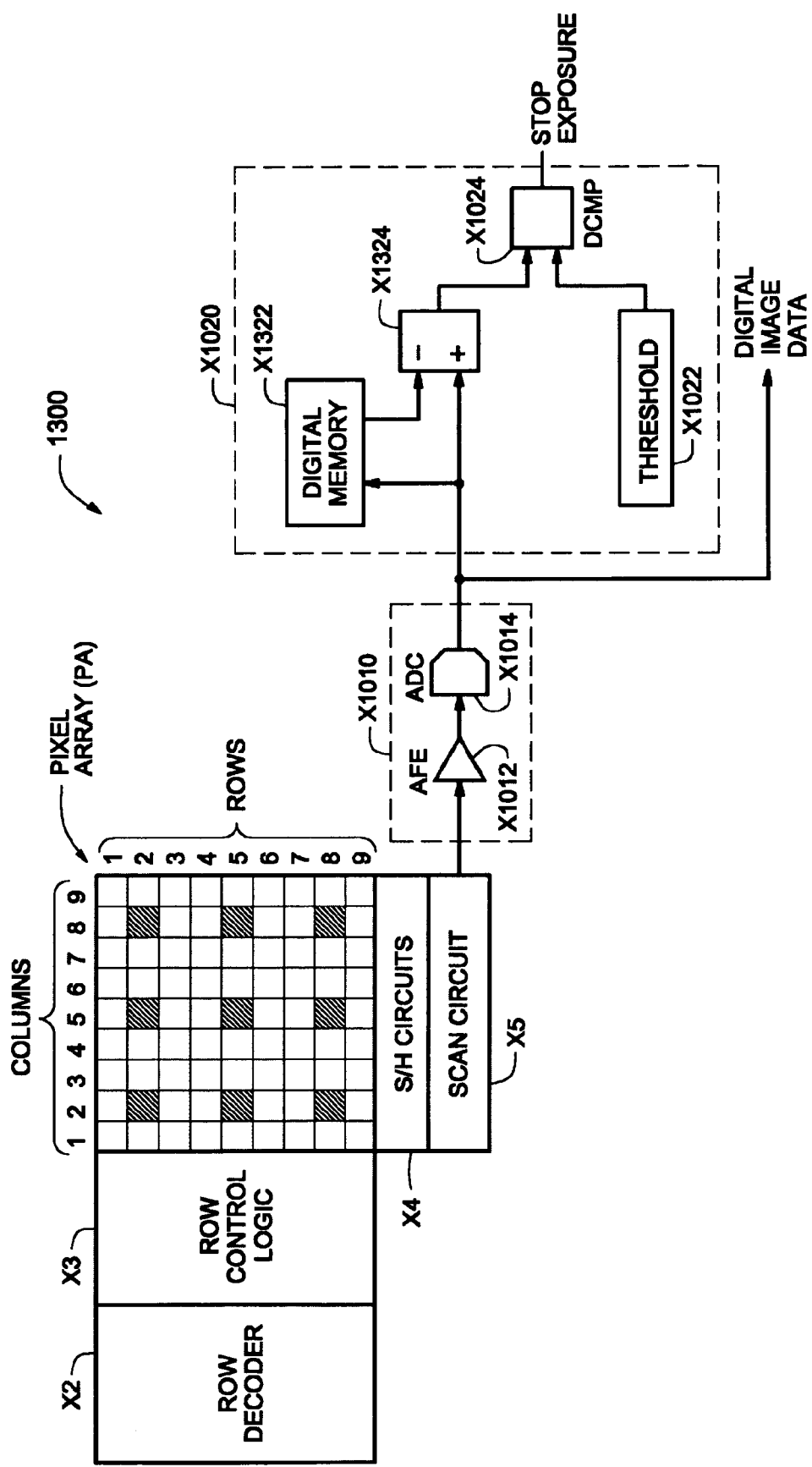
FIG. 13 is a schematic diagram of a fifth exemplary imaging system, in accordance with the present invention.

FIG. 13 shows still yet another exemplary imaging system (1300) that includes automatic exposure control that is arranged in accordance with the present invention. Imaging system 1300 is similar to imaging system 100 from FIG. 1, and also similar to imaging system 1000 described with reference to FIG. 10. Like components from FIG. 1 and FIG. 10 are labeled identically in FIG. 13, and operate in a similar manner to that already discussed above.

Imaging system 1300 differs from imaging system 1000 in that the pixel processing circuitry includes a digital processing portion (X1020) that includes a digital memory circuit (X1322) and a difference circuit (X1324). The digital memory circuit (X1322) is arranged to store the output codes from ADC X1014, and provide a digital code output when accessed. The difference circuit is arranged to determine a difference between the digital codes from ADC X1014 and the digital codes from digital memory circuit (X1322), and provide a digital code output in response thereto. The digital comparator circuit (X1024) is arranged to compare the digital code from the output of the difference circuit (X1024) and the exposure digital code associated with the exposure limit.

Imaging system 1300 is arranged to digitally cancel the errors introduced by mismatches between the reset level generator circuit (see X1030 in FIG. 10) and the actual reset levels of the pixels. During the initial reset, the reset levels of the pixels are fed through the AFE/ADC circuits, and the resulting ADC output code is stored in the digital memory (instead of an analog memory as shown in FIG. 12). During the exposure interval, the AE pixels are repeatedly scanned and the corresponding output codes from the ADC are provided to the difference circuit, while the previously stored reset levels of the corresponding AE pixels are retrieved from the digital memory circuit and provided to the difference circuit. By subtracting the reset level of the AE pixels from the ADC output code corresponding to the same AE pixel as exposed, an accurate measurement of the integrated photocurrent signal for the AE pixel is obtained. The resulting code from the measurement is digitally compared to the exposure limit to determine when to assert the stop exposure signal.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for adjusting an exposure time for pixels that are arranged in rows and columns in a pixel array, wherein each pixel in the pixel array is associated with a column readout line, the apparatus comprising:
   a first peak signal detector circuit that includes an input that is arranged to receive a first signal that is associated with a first one of the column readout lines, wherein the first one of the column readout lines is associated with a first column of the pixel array that includes a first selected pixel, and the first peak signal detector circuit is arranged to store a peak signal level that is associated with the first signal;
   a second peak signal detector circuit that includes an input that is arranged to receive a second signal that is associated with a second one of the column readout lines, wherein the second one of the column readout lines is associated with a second column of the pixel array that includes a second selected pixel, and the second peak signal detector circuit is arranged to store another peak signal level that is associated with the second signal;
   a digital timing and control circuit that is arranged to reset the peak levels associated with the first and second peak signal detector circuits during a reset time interval, assert a stop exposure signal during the reset time interval, and monitor the stop exposure signal during an exposure time interval; and
   a threshold detector circuit that includes an input that is selectively coupled to the first detector circuit in a first portion of the exposure time interval, and selectively coupled to the second detector circuit in a second portion of the exposure time interval, wherein the threshold detector circuit is arranged to selectively compare the peak levels associated with the first and second signals to an exposure threshold, and assert the stop exposure signal when at least one of the peak levels associated with the first and second peak signal detector circuits exceeds the exposure threshold.

2. An apparatus as in claim 1, further comprising a scan circuit that is arranged to selectively couple the first and second peak signal detectors to the threshold detector.

3. An apparatus as in claim 1, further comprising a scan circuit that is arranged to selectively couple the first and second peak signal detectors to a third peak signal detector circuit, the third peak signal detector circuit including an input that is arranged to receive one of the stored peak levels from the first and second peak signal detectors, and an output that is coupled to the threshold detector, wherein the third peak signal detector circuit is reset by the digital timing and control circuit, and arranged to store a third peak signal level that is associated with one of the first and second peak signal detector circuits.

4. An apparatus as in claim 1, wherein the exposure threshold corresponds to at least one of a static exposure threshold and a dynamically changed exposure threshold.

5. An apparatus as in claim 1, wherein the exposure threshold corresponds to at least one of a saturation limit associated with the pixel array, and a predetermined amount below the saturation limit.

6. An apparatus for adjusting an exposure time for pixels that are arranged in rows and columns in a pixel array, wherein each pixel in the pixel array is associated with a column readout line, the apparatus comprising:
   a digital timing and control circuit that is arranged to select rows of pixels in the pixel array such that a readout voltage corresponding to each pixel in the selected row is provided to the corresponding column readout lines, wherein the column readout lines include a group of column readout lines that are associated with a group of pixels from the array of pixels that are monitored for automatic exposure control; and
   a group of threshold detector circuits that are each associated with a corresponding column readout line from the group of column readout lines, each threshold detector circuit comprising a comparator circuit that includes a first input that is coupled to the corresponding column readout line, and a second input that is coupled to a reference voltage, such that each comparator circuit compares the corresponding readout voltage to an exposure threshold that is determined by the reference voltage such that the comparator asserts a stop exposure signal when the readout voltage exceeds the exposure threshold.

7. An apparatus as in claim 6, each of the group of threshold detector circuits further comprising a corresponding capacitance circuit that includes a first plate and a second plate, wherein the first plate is coupled to the first input of the corresponding comparator circuit and selectively coupled to another reference voltage, the second plate is coupled to the corresponding column readout line, and wherein the corresponding comparator circuit is arranged to compare the corresponding readout voltage to an exposure threshold that is determined by the reference voltage and the other reference voltage such that the comparator asserts a stop exposure signal when the readout voltage exceeds the exposure threshold.

8. An apparatus as in claim 7, wherein the digital timing and control circuit is arranged to reset a row of pixels such that the each pixel in the row is initialized to a respective initialization voltage in a first portion of a reset time interval, and select the row of pixels in a second portion of the reset time interval such that the readout voltages of the corresponding readout lines for the selected row of pixels include the initialization voltages, and the first reference voltage is coupled to the first inputs of the comparator circuits during the second portion of the reset time interval such that the associated capacitance circuits each store the difference between the corresponding readout voltage and the first reference voltage, whereby reset levels of the selected group of pixels are stored by the capacitance circuits.

9. An apparatus as in claim 8, wherein the digital timing and control circuit is arranged to select the row of pixels in an exposure time interval such that the group of threshold detectors monitors the exposure of each pixel from the selected group of pixels, wherein each capacitance circuit stores an associated voltage that corresponds to the difference between the first reference voltage and the initialization voltage.

10. An apparatus as in claim 6, wherein the digital timing and control circuit is arranged to deactivate an exposure signal in the reset time interval, and activate the exposure signal until the stop exposure signal is asserted during the exposure time interval, such that the exposure of the pixel array is automatically adjusted.

11. An apparatus as in claim 10, wherein the digital timing and control circuit is arranged to deactivate the exposure signal when the exposure time interval exceeds a predetermined time limit.

12. An apparatus as in claim 10, wherein the exposure signal actuates the exposure of the pixel array by at least one of activating a light source, closing a mechanical shutter, and closing an electronic shutter in the pixel array.

13. An apparatus as in claim 6, further comprising a reference circuit that is arranged to provide the reference voltage, wherein the exposure threshold is adjusted in response to a control signal by adjusting the reference voltage.

14. An apparatus for adjusting an exposure time for pixels that are arranged in rows and columns in a pixel array, wherein each pixel in the pixel array is associated with a column readout line, the apparatus comprising:
   a digital timing and control circuit that is arranged to select rows of pixels in the pixel array such that a readout voltage for each pixel in the selected row is provided to the corresponding column readout lines, wherein the column readout lines include a group of column readout lines that are associated with a group of pixels from the pixel array that are monitored for automatic exposure control; and
   a threshold detector circuit that is associated with a corresponding column readout line from the group of column readout lines, the threshold detector circuit comprising:
      a first capacitance circuit that includes a first plate that is coupled to the corresponding column readout line, and a second plate that is selectively coupled to a first reference voltage during a reset time interval, wherein the second plate is selectively coupled to a common node during an exposure time interval when a first row associated with a first pixel from the group of pixels is selected;
      a second capacitance circuit that has a first plate that is coupled to the corresponding column readout line, and a second plate that is selectively coupled to the first reference voltage during the reset time interval, wherein the second plate is selectively coupled to the common node during the exposure time interval when a second row associated with a second pixel from the group of pixels is selected; and
      a comparator circuit that is arranged to compare a voltage associated with the common node to a second reference voltage such that comparator circuit asserts a stop exposure signal when at least one of a first signal level and a second signal level exceed an exposure threshold, wherein the first signal level corresponds to a first exposure level that is associated with the first pixel, and the second signal level corresponds to a second exposure level that is associated with the second pixel.

15. An apparatus as in claim 14, wherein the threshold detector circuit is also associated with another corresponding column readout line from the group of column readout lines, the threshold detector circuit further comprising a third capacitance circuit that includes a first plate that is coupled to the other corresponding column readout line, and a second plate that is selectively coupled to the first reference voltage during the reset time interval, wherein the second plate is selectively coupled to the common node during an exposure time interval when a third row associated with a third pixel from the group of pixels is selected, such that the comparator circuit asserts the stop exposure signal when the a third signal level exceeds the exposure threshold, wherein the third signal level corresponds to a third exposure level that is associated with the third pixel.

16. An apparatus as in claim 14, further comprising a latch circuit that is arranged to sample the stop exposure signal when at least one of the first and second capacitor circuits is coupled to the common node during the exposure time interval.

17. An apparatus as in claim 14, wherein the first and second capacitance circuits are arranged to cancel the effects of fixed pattern noise by sampling the readout voltages during the reset time interval, and receiving the readout voltages associated with the first and second pixels during the exposure time interval, such that the voltages associated with the first plate of the first and second capacitance circuits corresponds to the difference between the first reference voltage and signal levels that are associated with the first and second pixels, respectively.

18. An apparatus for adjusting an exposure time for pixels that are arranged in rows and columns in a pixel array, wherein each pixel in the pixel array is associated with a column readout line, the apparatus comprising:
   a means for resetting that is arranged to initialize the pixels in the pixel array during a reset time interval;
   a means for selecting that is arranged to select a selected row from the pixel array such that the pixels associated with the selected row provide readout voltages to the corresponding column readout lines;
   a means for comparing that is arranged to compare signal levels that are associated with a group of pixels to an exposure threshold, wherein the group of pixels are selected by the means for selecting during an exposure time interval; and
   a means for coupling that is arranged to selectively couple the readout voltages associated with the group of pixels to the means for comparing during the exposure time interval; and
   a means for asserting that is arranged to assert a stop exposure signal when at least one of the signal levels that are associated with the group of pixels exceed the exposure threshold.

19. An apparatus as in claim 18, further comprising a means for storing that is arranged to store the readout voltages that are associated with the column readout lines of the group of pixels during the reset time interval such that the means for comparing cancels the effect of fixed pattern noise.

20. A method for adjusting an exposure time for pixels in a pixel array that includes a number of rows, the method comprising:
   starting an exposure time interval;
   selecting a row in the pixel array that includes sparse pixels during the exposure time interval, wherein the sparse pixels correspond to a selected group of pixels from the pixel array that are monitored for automatic exposure adjustment;
   providing readout signals to column outputs of the selected row;
   comparing signal levels of the sparse pixels in the selected row to an exposure threshold;
   selecting another row in the pixel array that includes sparse pixels when the signal levels of the sparse pixels fail to exceed the exposure threshold; and stopping the exposure time interval when the signal level of at least one of the sparse pixels exceeds the exposure threshold.

21. A method as in claim 20, further comprising selecting each row in the pixel array during a reset time interval, and initializing each pixel in the selected row to a reset condition during the reset time interval.

22. A method as in claim 20, further comprising: sampling reset levels of each sparse pixel, and determining signal levels for each sparse pixel with the sampled reset levels and the readout signals, such that the signal levels are adjusted to minimize the effects of fixed pattern noise on the exposure time adjustment.

23. A method as in claim 22, the step of sampling reset levels further comprising selecting each row in the pixel array that includes sparse pixels, and sampling the reset levels of each sparse pixel that is associated with the selected row.

24. A method as in claim 20, further comprising processing image data from the pixel array after stopping the exposure time interval, the step of processing image data comprising:
   selecting each row of the pixel array;
   reading signal levels from each pixel in the selected row;
   initializing each pixel in the selected row to a reset condition after the step of reading signals;
   reading reset levels from each pixel in the selected row after the step of initializing; and
   calculating the difference between the signal level and the reset level for each pixel to determine image data for each pixel.

25. A method as in claim 20, further comprising at least one of selecting a random group of pixels from the pixel array for the sparse pixels, and selecting a pseudo-random group of pixels from the pixel array for the sparse pixels.

26. A method for adjusting an exposure time for pixels in a pixel array that includes a number of rows, the method comprising:
   resetting a group of peak signal detector during a reset time interval;
   starting an exposure time interval;
   finding a maximum of sparse readout pixels during the exposure time interval, wherein the sparse readout pixels correspond to a selected group of pixels from the pixel array, the step of finding a maximum further comprising:
      selecting a row in the pixel array that includes sparse pixels;
      coupling output signals from each sparse pixel in the selected row to a corresponding peak signal detector;
      detecting peak signal levels in each peak signal detector; and
      repeating the steps of selecting each row, coupling output signals, and detecting peak signal levels until each row in the pixel array that includes sparse pixels is processed;
   finding a global maximum of peak levels after the step of finding a maximum sparse readout pixels, the step of finding a global maximum further comprising:
      coupling the detected peak signal levels to a global peak signal detector after the step of resetting the global peak signal detector; and
      storing a global maximum peak in the global peak signal detector;
   comparing the output of the global peak signal detector to an exposure threshold;
   repeating the steps of finding a maximum and finding a global maximum when the exposure threshold exceeds the global maximum; and
   stopping the exposure time interval when the global maximum exceeds the exposure threshold.

27. A method as in claim 26, further comprising selecting each row in the pixel array during a reset time interval, and initializing each pixel in the selected row to a reset condition during the reset time interval.

28. A method as in claim 26, further comprising processing image data from the pixel array after stopping the exposure time interval, the step of processing image data comprising:
   selecting each row of the pixel array;
   reading signal levels from each pixel in the selected row;
   initializing each pixel in the selected row to a reset condition after the step of reading signals;
   reading reset levels from each pixel in the selected row after the step of initializing; and
   calculating the difference between the signal level and the reset level for each pixel to determine image data for each pixel.

29. A method as in claim 26, further comprising at least one of selecting a random group of pixels from the pixel array for the sparse readout pixels, and selecting a pseudo-random group of pixels from the pixel array for the sparse readout pixels.

30. An apparatus for adjusting an exposure time for pixels that are arranged in rows and columns in a pixel array, wherein each pixel in the pixel array is associated with a column readout line, the apparatus comprising:
   a reset level generator that is arranged to provide a reference voltage that corresponds to an approximation of reset levels for the pixel array;
   a sample and hold circuit that is arranged to provide sampled signals by sampling the column readout lines, wherein the reference voltage is employed by the sample and hold circuit to reduce system offsets in the sampled signals;
   a scan circuit that is arranged to provide analog image data by scanning a group of the sampled signals during an exposure time interval, wherein the group of the sampled signals corresponds to a group of the pixels in the pixel array;
   a pixel processing circuit that is arranged to receive the analog image data from the scan circuit during an exposure time interval, wherein the pixel processing circuit includes an analog processing portion and a digital processing portion, wherein the analog portion of the pixel processing circuit includes an analog-to-digital converter that provides digital image data corresponding to the analog image data, and wherein the digital portion of the pixel processing circuit includes a digital comparator that is arranged to compare the digital image data to a digital code, wherein the digital code is associated with an exposure threshold, and wherein the digital comparator asserts a stop exposure signal when the digital image data exceeds the digital code.

31. An apparatus as in claim 30, the analog processing portion of the pixel processing circuit further comprising an analog front end that is arranged to provide at least one of a gain and an offset to the analog image data such that the input to the analog-to-digital converter is adjusted.

32. An apparatus as in claim 30, wherein the digital processing portion of the pixel processing circuit is provided by at least one of a programmable logic array, a microprocessor, and a microcontroller.

33. An apparatus for adjusting an exposure time for pixels that are arranged in rows and columns in a pixel array, wherein each pixel in the pixel array is associated with a column readout line, the apparatus comprising:
  a reset level generator that is arranged to provide a reference voltage that corresponds to an approximation of reset levels for the pixel array;
  a sample and hold circuit that is arranged to provide sampled signals by sampling the column readout lines, wherein the reference voltage is employed by the sample and hold circuit to reduce system offsets in the sampled signals;
  a scan circuit that is arranged to provide a first analog image data and a second analog image data by scanning a group of the sampled signals during an exposure time interval, wherein the group of the sampled signals corresponds to a group of the pixels in the pixel array; and
  a pixel processing circuit that is arranged to receive the first analog image data and the second analog image data from the scan circuit during an exposure time interval, wherein the pixel processing circuit includes an analog processing portion and a digital processing portion, wherein the analog portion of the pixel processing circuit includes a first and second analog-to-digital converter that provides first and second digital image data corresponding to the first and second analog image data, and wherein the digital portion of the pixel processing circuit includes a first and a second digital comparator that is arranged to compare the first and second digital image data to a digital code, wherein the digital code is associated with an exposure threshold, wherein the first digital comparator asserts a stop exposure signal when the first digital image data exceeds the digital code, and wherein the second digital comparator asserts the stop exposure signal when the second digital image data exceeds the digital code.

34. An apparatus as in claim 33, the analog processing portion of the pixel processing circuit further comprising a first and a second analog front end that are each arranged to provide at least one of a gain and an offset to the first and second analog image data signals, respectively, such that the inputs to the analog-to-digital converters are adjusted.

35. An apparatus as in claim 33, the digital processing portion of the pixel processing circuit further comprising a line buffer that is arranged to reorder the first and second digital image data signals, and provides a digital image data output signal during a readout time interval.

36. An apparatus as in claim 33, wherein the digital processing portion of the pixel processing circuit is provided by at least one of a programmable logic array, a microprocessor, and a microcontroller.

37. An apparatus for adjusting an exposure time for pixels that are arranged in rows and columns in a pixel array, wherein each pixel in the pixel array is associated with a column readout line, the apparatus comprising:
  a reset memory circuit that is coupled to the column readout lines and arranged to store readout voltages from a group of column readout lines during a reset time interval, wherein the group of column readout lines corresponds to a group of pixels from the pixel array;
  a sample and hold circuit that is arranged to provide sampled signals by sampling the column readout lines, wherein the stored readout voltages from the reset memory circuit are employed by the sample and hold circuit during the exposure time interval to reduce fixed pattern noise in the sampled signals;
  a scan circuit that is arranged to provide analog image data by scanning a group of the sampled signals during an exposure time interval, wherein the group of the sampled signals corresponds to the group of pixels in the pixel array; and
  a pixel processing circuit that is arranged to receive the analog image data from the scan circuit during an exposure time interval, wherein the pixel processing circuit includes an analog processing portion and a digital processing portion, wherein the analog portion of the pixel processing circuit includes an analog-to-digital converter that provides digital image data corresponding to the analog image data, and wherein the digital portion of the pixel processing circuit includes a digital comparator that is arranged to compare the digital image data to a digital code, wherein the digital code is associated with an exposure threshold, and wherein the digital comparator asserts a stop exposure signal when the digital image data exceeds the digital code.

38. An apparatus as in claim 37, the analog processing portion of the pixel processing circuit further comprising an analog front end that is arranged to provide at least one of a gain and an offset to the analog image data such that the input to the analog-to-digital converter is adjusted.

39. An apparatus as in claim 37, wherein the digital processing portion of the pixel processing circuit is provided by at least one of a programmable logic array, a microprocessor, and a microcontroller.

40. An apparatus for adjusting an exposure time for pixels that are arranged in rows and columns in a pixel array, wherein each pixel in the pixel array is associated with a column readout line, the apparatus comprising:
  a reset level generator that is arranged to provide a reference voltage that corresponds to an approximation of reset levels for the pixel array;
  a sample and hold circuit that is arranged to provide sampled signals by sampling the column readout lines, wherein the reference voltage is employed by the sample and hold circuit to reduce system offsets in the sampled signals;
  a scan circuit that is arranged to provide analog image data by scanning a group of the sampled signals during an exposure time interval, wherein the group of the sampled signals corresponds to a group of the pixels in the pixel array;
  a pixel processing circuit that is arranged to receive the analog image data from the scan circuit during an exposure time interval, wherein the pixel processing circuit includes an analog processing portion and a digital processing portion, wherein the analog portion of the pixel processing circuit includes an analog-to-digital converter that provides digital image data corresponding to the analog image data, and wherein the digital portion of the pixel processing circuit includes a digital memory circuit that is arranged to store the digital image data, a difference circuit that is arranged to provide a difference code in response to a difference between the digital image data in the digital memory and digital image data from the analog-to-digital converter, and a digital comparator that is arranged to compare the difference code to a digital exposure code, wherein the digital threshold code is associated with an exposure threshold, and wherein the digital comparator asserts a stop exposure signal when the difference code exceeds the digital threshold code.

41. An apparatus as in claim 40, the analog processing portion of the pixel processing circuit further comprising an analog front end that is arranged to provide at least one of a gain and an offset to the analog image data such that the input to the analog-to-digital converter is adjusted.

42. An apparatus as in claim 40, wherein the digital processing portion of the pixel processing circuit is provided by at least one of a programmable logic array, a microprocessor, and a microcontroller.

* * * * *